(12) United States Patent
Garg et al.

(10) Patent No.: US 10,567,327 B2
(45) Date of Patent: Feb. 18, 2020

(54) AUTOMATIC CREATOR IDENTIFICATION OF CONTENT TO BE SHARED IN A SOCIAL NETWORKING SYSTEM

(71) Applicants: Avichal Garg, Menlo Park, CA (US); Siriwong Wongthongserm, Menlo Park, CA (US)

(72) Inventors: Avichal Garg, Menlo Park, CA (US); Siriwong Wongthongserm, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 322 days.

(21) Appl. No.: 14/292,579

(22) Filed: May 30, 2014

(65) Prior Publication Data
US 2015/0350259 A1 Dec. 3, 2015

(51) Int. Cl.
| | |
|---|---|
| *H04L 12/58* | (2006.01) |
| *H04L 29/08* | (2006.01) |
| *G06Q 50/00* | (2012.01) |
| *H04L 29/06* | (2006.01) |
| *H04N 21/472* | (2011.01) |
| *G06Q 10/10* | (2012.01) |
| *G06F 16/958* | (2019.01) |

(52) U.S. Cl.
CPC ............ *H04L 51/32* (2013.01); *G06F 16/958* (2019.01); *G06Q 10/10* (2013.01); *G06Q 50/01* (2013.01); *H04L 65/4084* (2013.01); *H04L 67/02* (2013.01); *H04N 21/472* (2013.01)

(58) Field of Classification Search
CPC ..... H04L 65/4084; H04L 51/32; H04L 67/02; H04N 21/472; G06Q 10/10; G06Q 30/02; G06Q 30/0201; G06Q 30/0214; G06Q 30/0641; G06Q 50/01; G06F 17/30038; G06F 17/60; G06F 17/3089; G06F 16/95
USPC ....................... 715/751, 26; 709/231; 725/25
See application file for complete search history.

(56) References Cited

U.S. PATENT DOCUMENTS

| | | | |
|---|---|---|---|
| 5,978,842 A | 11/1999 | Noble et al. | |
| 6,011,537 A | 1/2000 | Slotznick | |
| 6,055,570 A | 4/2000 | Nielsen | |
| 6,895,551 B1 * | 5/2005 | Huang .............. | G06F 17/30887 707/999.003 |

(Continued)

OTHER PUBLICATIONS

Final Office Action dated Apr. 8, 2016 for U.S. Appl. No. 14/174,627, filed Feb. 6, 2014, 26 pages.

(Continued)

*Primary Examiner* — Aaron N Strange
(74) *Attorney, Agent, or Firm* — Keller Jolley Preece

(57) ABSTRACT

A method for automatic creator identification of content to be shared in a network service. An exemplary method includes receiving a resource identifier that identifies a resource including content that is to be shared with a set of one or more users of the network service. A request for the resource identified by the resource identifier is transmitted by a network interface and the resource is received from a server end station. The method includes automatically identifying a creator of the content based upon the received resource and transmitting a preview to be displayed to the set of users that identifies the creator and includes a user interface element allowing the respective other user to view additional content from the creator or become associated with the creator within the network service.

20 Claims, 9 Drawing Sheets

(56) References Cited

U.S. PATENT DOCUMENTS

| | | | |
|---|---|---|---|
| 7,433,895 B2 | 10/2008 | Li et al. | |
| 7,478,054 B1 | 1/2009 | Adams et al. | |
| 7,751,592 B1 | 7/2010 | Rosenberg et al. | |
| 7,788,258 B1 | 8/2010 | Malpani et al. | |
| 7,849,093 B2 | 12/2010 | Farago | |
| 7,873,988 B1* | 1/2011 | Issa | G06F 21/10 |
| | | | 726/26 |
| 7,992,171 B2* | 8/2011 | Amidon | G06Q 30/0201 |
| | | | 380/201 |
| 8,054,496 B1 | 11/2011 | Rehfeld | |
| 8,306,326 B2 | 11/2012 | Behm et al. | |
| 8,745,481 B1* | 6/2014 | Ulm | G06F 17/211 |
| | | | 715/201 |
| 8,938,500 B1* | 1/2015 | Acharya | G06Q 50/01 |
| | | | 705/319 |
| 9,152,312 B1* | 10/2015 | Terleski | G06F 3/0488 |
| 9,183,172 B1* | 11/2015 | Anderson | H04N 21/4788 |
| 9,183,259 B1* | 11/2015 | Marra | G06F 17/30867 |
| 9,183,657 B2* | 11/2015 | Belanger | H04N 5/262 |
| 9,256,620 B2* | 2/2016 | Amacker | G06K 9/00677 |
| 9,442,903 B2 | 9/2016 | Katic | |
| 9,659,104 B2* | 5/2017 | Soon-Shiong | G06F 17/3089 |
| 9,832,284 B2 | 11/2017 | Katic | |
| 2002/0073058 A1 | 6/2002 | Kremer et al. | |
| 2002/0194434 A1 | 12/2002 | Kurasugi | |
| 2002/0199187 A1* | 12/2002 | Gissin | G06F 3/0481 |
| | | | 725/32 |
| 2003/0004909 A1 | 1/2003 | Chauhan et al. | |
| 2004/0205514 A1 | 10/2004 | Sommerer et al. | |
| 2004/0205671 A1* | 10/2004 | Sukehiro | G06F 17/2735 |
| | | | 715/259 |
| 2005/0198299 A1* | 9/2005 | Beck | G06Q 10/107 |
| | | | 709/226 |
| 2005/0216300 A1* | 9/2005 | Appelman | G06Q 10/10 |
| | | | 705/319 |
| 2006/0112092 A1 | 5/2006 | Ziou et al. | |
| 2006/0287916 A1* | 12/2006 | Starr | G06Q 30/02 |
| | | | 705/14.46 |
| 2007/0073833 A1 | 3/2007 | Roy et al. | |
| 2007/0078850 A1 | 4/2007 | Aziz et al. | |
| 2007/0112819 A1 | 5/2007 | Dettinger et al. | |
| 2008/0027928 A1* | 1/2008 | Larson | G06F 17/30864 |
| 2008/0133311 A1* | 6/2008 | Madriz Ottolina | G06Q 10/10 |
| | | | 705/14.69 |
| 2008/0154931 A1 | 6/2008 | Jacobs et al. | |
| 2009/0034851 A1 | 2/2009 | Fan et al. | |
| 2009/0099919 A1* | 4/2009 | Schultheiss | G06Q 10/00 |
| | | | 705/14.1 |
| 2009/0259723 A1 | 10/2009 | Roic et al. | |
| 2010/0114899 A1 | 5/2010 | Guha et al. | |
| 2010/0223126 A1 | 9/2010 | Tung | |
| 2010/0293048 A1* | 11/2010 | Singolda | G06Q 30/02 |
| | | | 705/14.43 |
| 2011/0022641 A1 | 1/2011 | Werth et al. | |
| 2011/0078587 A1* | 3/2011 | Guy | G06Q 10/107 |
| | | | 715/752 |
| 2011/0145698 A1 | 6/2011 | Penov et al. | |
| 2011/0164126 A1 | 7/2011 | Ambor et al. | |
| 2011/0231296 A1* | 9/2011 | Gross | G06Q 10/10 |
| | | | 705/37 |
| 2011/0264641 A1 | 10/2011 | Yang et al. | |
| 2011/0265011 A1* | 10/2011 | Taylor | G06Q 50/01 |
| | | | 715/751 |
| 2012/0017179 A1 | 1/2012 | Yoon et al. | |
| 2012/0084340 A1* | 4/2012 | McCormack | G06Q 30/01 |
| | | | 709/203 |
| 2012/0158494 A1 | 6/2012 | Reis et al. | |
| 2012/0232973 A1* | 9/2012 | Robb | G06Q 30/0214 |
| | | | 705/14.17 |
| 2012/0242689 A1 | 9/2012 | Miyata | |
| 2012/0269425 A1 | 10/2012 | Marchesotti et al. | |
| 2012/0278338 A1 | 11/2012 | Liao et al. | |
| 2013/0080900 A1 | 3/2013 | Wilde et al. | |
| 2013/0084912 A1* | 4/2013 | Lindner | H04W 4/10 |
| | | | 455/518 |
| 2013/0097625 A1* | 4/2013 | Thorwirth | G06F 17/30038 |
| | | | 725/25 |
| 2013/0237325 A1* | 9/2013 | Chudley | A63F 13/55 |
| | | | 463/42 |
| 2013/0259375 A1 | 10/2013 | Dunlop et al. | |
| 2013/0262559 A1* | 10/2013 | Neerings | G06Q 30/02 |
| | | | 709/203 |
| 2013/0268829 A1 | 10/2013 | Lansford et al. | |
| 2014/0059436 A1* | 2/2014 | Swenson | G11B 27/105 |
| | | | 715/725 |
| 2014/0075296 A1 | 3/2014 | Schaad et al. | |
| 2014/0100852 A1* | 4/2014 | Simons | G10L 13/04 |
| | | | 704/260 |
| 2014/0146095 A1 | 5/2014 | Park et al. | |
| 2014/0258849 A1 | 9/2014 | Chung et al. | |
| 2015/0012811 A1 | 1/2015 | Chan et al. | |
| 2015/0095770 A1 | 4/2015 | Mani et al. | |
| 2015/0143211 A1 | 5/2015 | Kaufthal et al. | |
| 2015/0220500 A1* | 8/2015 | Katic | G06F 17/30899 |
| | | | 715/207 |
| 2015/0220787 A1* | 8/2015 | Folkens | G06F 17/30268 |
| | | | 382/103 |
| 2015/0331552 A1* | 11/2015 | Young | G06F 3/0481 |
| | | | 715/808 |
| 2015/0331842 A1 | 11/2015 | Costa et al. | |
| 2015/0332384 A1* | 11/2015 | Garcia | G06Q 30/0641 |
| | | | 705/27.1 |
| 2016/0004711 A1* | 1/2016 | Soon-Shiong | G06Q 30/02 |
| | | | 715/205 |
| 2016/0286256 A1* | 9/2016 | Shin | H04N 21/27 |
| 2016/0308805 A1* | 10/2016 | Gao | G06F 17/24 |
| 2016/0342624 A1* | 11/2016 | Mazur | G06Q 30/0241 |
| 2017/0024399 A1* | 1/2017 | Boyle | G06F 17/30964 |

OTHER PUBLICATIONS

Non-Final Office Action dated Jan. 20, 2016 for U.S. Appl. No. 14/174,676, filed Feb. 6, 2014, 18 pages.
Non-Final Office Action dated Apr. 22, 2016 for U.S. Appl. No. 14/141,678, filed Dec. 27, 2013, 24 pages.
Non-Final Office Action dated Aug. 25, 2015 for U.S. Appl. No. 14/141,678, filed Dec. 27, 2013, 25 pages.
Non-Final Office Action dated Nov. 6, 2015 for U.S. Appl. No. 14/174,627, filed Feb. 6, 2014, 21 pages.
Final Office Action from U.S. Appl. No. 14/141,678, dated Jan. 17, 2017, 24 pages.
Final Office Action from U.S. Appl. No. 14/174,676 dated Jul. 28, 2016, 19 pages.
Final Office Action from U.S. Appl. No. 14/174,676 , dated Jun. 16, 2017, 21 pages.
Non-Final Office Action from U.S. Appl. No. 14/141,678, dated Aug. 11, 2016, 24 pages.
Non-Final Office Action from U.S. Appl. No. 14/141,678, dated Jun. 8, 2017, 22 pages.
Non-Final Office Action from U.S. Appl. No. 14/174,676 dated Nov. 30, 2016, 20 pages.
Notice of Allowance from U.S. Appl. No. 14/174,627, dated Jul. 29, 2016, 12 pages.
U.S. Appl. No. 14/141,678, dated Oct. 2, 2017, Notice of Allowance.
U.S. Appl. No. 14/174,676, dated Oct. 12, 2017, Office Action.
U.S. Appl. No. 14/174,676, dated Jun. 29, 2018, Notice of Allowance.

* cited by examiner

RECEIVING, FROM A USER DEVICE OF A USER OF A SOCIAL NETWORKING SYSTEM, A SHARING MESSAGE COMPRISING A RESOURCE IDENTIFIER THAT IDENTIFIES A RESOURCE INCLUDING CONTENT THAT IS TO BE SHARED WITH ONE OR MORE OTHER USERS OF THE SOCIAL NETWORKING SYSTEM 702

TRANSMITTING, FROM A NETWORK INTERFACE TO A SERVER END STATION, A REQUEST FOR THE RESOURCE IDENTIFIED BY THE RESOURCE IDENTIFIER 704

RECEIVING, AT THE NETWORK INTERFACE, THE RESOURCE FROM THE SERVER END STATION 706

AUTOMATICALLY IDENTIFYING A CREATOR OF THE CONTENT BASED UPON THE RECEIVED RESOURCE 708

IDENTIFYING AN HTML META TAG WITHIN THE HTML DOCUMENT; AND
SELECTING, AS THE CREATOR, A VALUE OF THE HTML META TAG 710

IDENTIFYING A FIRST SET OF ONE OR MORE CANDIDATE CREATORS FROM THE HTML DOCUMENT;
IDENTIFYING A SECOND SET OF ONE OR MORE CANDIDATE CREATORS FROM TEXT PROVIDED BY OTHER USERS OF THE SOCIAL NETWORKING SYSTEM DESCRIBING OR COMMENTING UPON THE CONTENT; AND
IDENTIFYING THE CREATOR BASED UPON THE FIRST SET OF CANDIDATE CREATORS AND THE SECOND SET OF CANDIDATE CREATORS 712

CAUSING A PREVIEW TO BE DISPLAYED TO THE ONE OR MORE OTHER USERS OF THE SOCIAL NETWORKING SYSTEM ON A SET OF ONE OR MORE OTHER USER DEVICES, WHEREIN THE PREVIEW IDENTIFIES THE CREATOR AND INCLUDES A USER INTERFACE ELEMENT ALLOWING THE RESPECTIVE OTHER USER TO VIEW ADDITIONAL CONTENT FROM THE CREATOR OR BECOME ASSOCIATED WITH THE CREATOR WITHIN THE SOCIAL NETWORKING SYSTEM 714

AUTOMATIC CREATOR IDENTIFICATION OF CONTENT TO BE SHARED IN A SOCIAL NETWORKING SYSTEM

FIELD

Embodiments of the invention relate to automatically identifying creators of content to be shared in a preview of the content.

BACKGROUND

One of the core functionalities provided by social networking systems is enabling the sharing of information. After users of social networks form connections with other users, users continue to use the social networks to both share information and discover information shared by others. For example, users are able to share thoughts, pictures, videos, and links to other content available on the Internet.

To provide additional value to users, some social networks provide recommendations to encourage its users to connect to other users and/or discover additional content of interest to the user. For example, the social networking system Facebook sometimes suggests other users or pages that a user might want to connect and/or interact with. These recommendations often lead to increased user engagement within the social networking system and thus more content shared in the social network, which in turn leads to increased user engagement, and so on. Similarly, these recommendations also lead to increased activity by entities having pages in the social network, such as organizations, brands, or clubs. Accordingly, social networking systems continue to seek ways to provide customized, interesting, and relevant content to its users.

BRIEF DESCRIPTION OF THE DRAWINGS

The invention may best be understood by referring to the following description and accompanying drawings that are used to illustrate embodiments of the invention. In the drawings:

FIG. 7 illustrates a general flow for automatic creator identification of content to be shared in a social networking system according to an embodiment of the invention.

DESCRIPTION OF EMBODIMENTS

Figure 1:
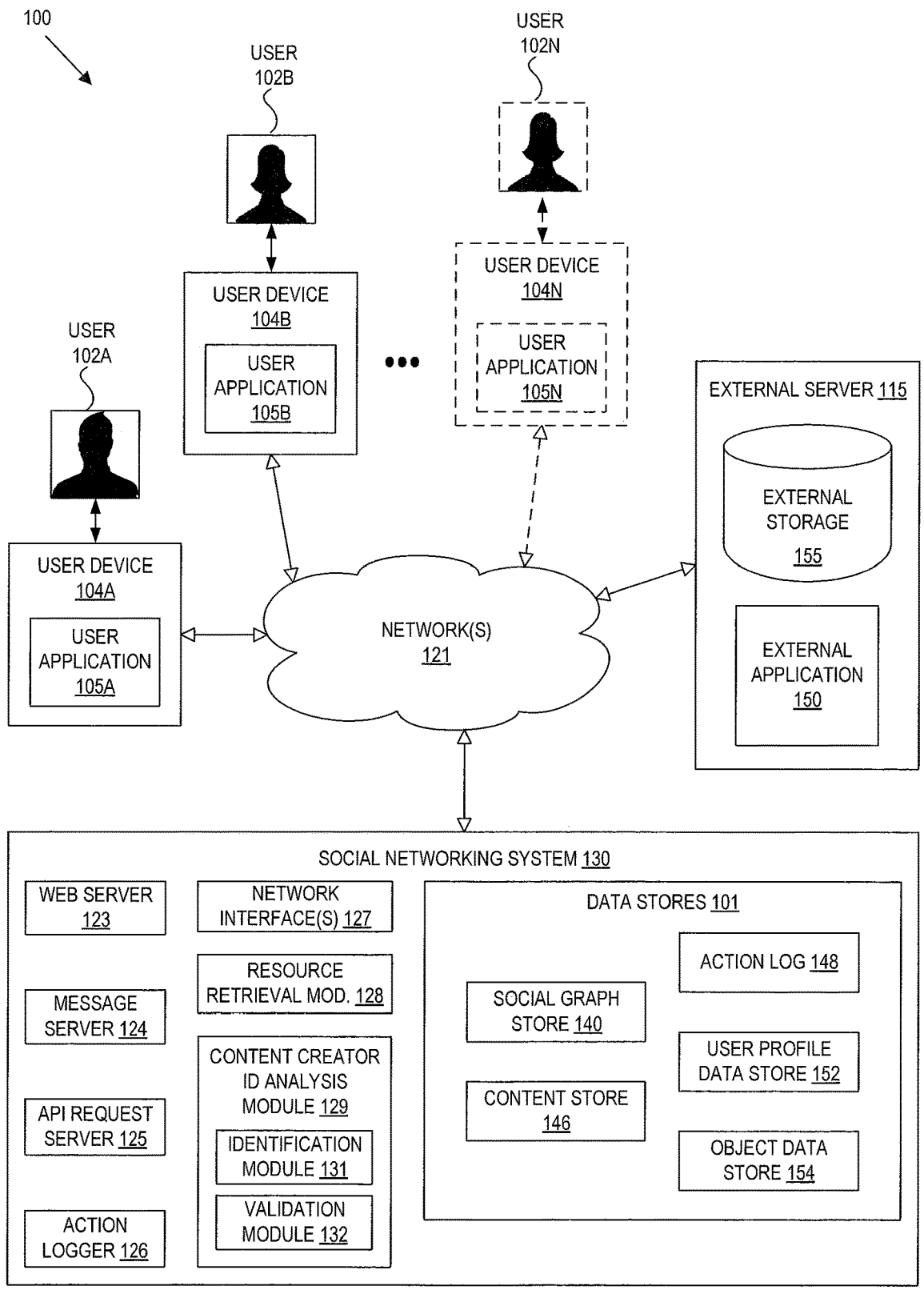
FIG. 1 illustrates an example network environment of a system including a social networking system that offers its users the ability to communicate and interact with other users and entities of the social networking system according to an embodiment of the invention.

Social networking systems benefit from techniques that improve the ability of users to share online content with other users of the social networking system. These users may share content by sending or posting electronic messages to the social networking system that include resource identifiers (e.g., "links" or hyperlinks, such as a Uniform Resource Locator (URL) or Uniform Resource Identifier (URI)) that identify "online" content, which is typically provided by a third party server reachable through the Internet. However, when a user shares a URL, the underlying content—and in particular, the underlying creator of that content—typically is not obvious from the URL itself. Additionally, there is no easy way for users to find more content from the same creator, which might already exist within the social networking system. Accordingly, social networking systems can benefit from techniques to enable the automatic identification of content creators for resources shared between users of the social networking system, and the recommendation of additional content from the content creator that is available within the social networking system.

Detailed below are methods, systems, and user interfaces for providing customized, interesting, and relevant content to the users of a social networking system through the automatic identification of a content creator for external content shared within the social networking system. In the following description, numerous specific details are set forth. However, it is understood that embodiments of the invention may be practiced without these specific details. While a social networking system is used to describe embodiments of preview generation for online content, it will be understood that these concepts are generally applicable to generating previews for online content for other network services/entities, websites, etc. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The methods, systems, and user interfaces described herein utilize both publicly available information, as well as information provided by users of the social networking system. It should be noted that all use of such information is to be explicitly subject to all privacy settings of the involved users and the privacy policy of the social networking system as a whole.

In an embodiment of the invention, when a user shares a message including a URL (i.e., resource identifier), the user device of the user transmits a sharing message including the message and the URL to the social networking system (or a network service otherwise receives a URL), which retrieves the resource (e.g., a web page and possibly additional information referenced by the web page, such as images, videos, formatting code (e.g., a style sheet), etc.) identified by the URL. The resource—or set of one or more files—includes content that the user is attempting to share. For example, a user may share a URL of a webpage that includes a video (i.e., the content), though the webpage may also include other text, multimedia, advertisements, etc. Many forms of content exist, and may include an article, an essay, a photograph, an illustration, a movie/video, a game, a tutorial, source code for a computer program, a combination of one or more of these items, or any other type of information or data available on the internet.

An item of content has a creator of the content. The creator may be a person or entity associated with the creation of the content—e.g., a person or entity that wrote, recorded, captured, illustrated, arranged, composed, edited, photographed, and/or modified the content. However, in some embodiments of the invention, the term creator may also refer to a person or entity that published the content. For example, an article on the website of an online magazine may have a creator that is the author of the article, a creator that is a photographer of an image in the article, a creator that is an author of a comment made about the article, or even a creator that is an entity representing the online magazine (i.e., the publisher).

Upon retrieving the resource, which may be cached or otherwise stored on storage devices for a period of time, the social networking system automatically analyzes the resource to identify one or more creators of the content of the resource (as described herein). In an embodiment, the social networking system determines a trust or "authority score" associated with the domain (or IP address) of the server providing the resource. Many URLs include a domain (e.g., "example.com" or "www.example.com" within a URL of "http://www.example.com/index.html") or IP address (e.g., "1.2.3.4" within a URL of "http://1.2.3.4/index.html"). In an embodiment, the social networking system maintains an authority score for one or more domains or IP addresses that represents how trustworthy the information from that domain is. The authority scores may be manually entered by an administrator of the social networking system based upon personal preference or based upon a statistical analysis of the degree of correctness of previous information received from the domain or IP address. The social networking system selects one of multiple analysis procedures based upon the authority score. Alternatively, there is only one analysis procedure and in some embodiments the choice between analysis procedures depends upon other factors, such as the type of information within the retrieved resource itself.

Upon identifying one or more creators of the content of the resource, in an embodiment the social networking system will attempt to map the identified creator to an entity or page within the social network associated with the identified creator. For example, a shared resource may include an essay by a television personality, and that television personality may have a page within the social networking system. In an embodiment, the social networking system will share a preview including the user's message text and the resource identifier along with information describing the identified creator. In an embodiment, the preview includes a user interface element allowing other users of the social network to view additional content from the creator (e.g., visit a page of the creator) or become associated with the creator within the social networking system (e.g., "like" the creator).

FIG. 1 illustrates an example network environment of a system 100 including a social networking system 130 that offers its users 102A-102N the ability to communicate and interact with other users 102A-102N and entities of the social networking system 130 according to an embodiment of the invention. The illustrated social networking system 130 includes a content creator identification analysis module 129 for automatically identifying content creators from resources shared between users of the social networking system in accordance with an embodiment of the invention.

In some embodiments, the social networking system 130 comprises one or more computing devices storing user profiles associated with users 102A-102N and/or other objects, as well as connections between users and other users 102A-102N and/or objects.

The user devices 104A-104N that are enabled to interact with social networking system 130 can be any type of computing device capable of receiving user input as well as transmitting and/or receiving data via a network (e.g., network 121). For example, the user devices 104A-104N can include conventional computer systems, such as a desktop or laptop computer, or may include devices having computer functionalities such as Personal Digital Assistants (PDA), cellular or mobile telephones, smart-phones, in- or out-of-car navigation systems, gaming devices, or other electronic devices.

In one embodiment, a user device (e.g. 104A) may execute a user application (e.g. 105A) allowing a user 102A of the user device 104A to interact with the social networking system 130. For example, the user application 105A may be a web browser application (e.g., Microsoft Windows Internet Explorer, Mozilla Firefox, Apple Safari, Google Chrome, Opera, etc.). In an embodiment, the user application 105A is a special-purpose client application (e.g., Facebook for iPhone or iPad, etc.), and in an embodiment the user application 105A is the native operating system of the user device 104A, such as Windows®, Mac OSX®, IOS®, or ANDROID™, which may utilize an Application Programming Interface (API) to directly interface with the social networking system 130 through API request server 125.

The user devices 104A-104N are configured to communicate with the social networking system 130 via a network 121 or collection of networks—such as the Internet, a corporate Intranet, a Virtual Private Network (VPN), a Local Area Network (LAN), a Wireless Local Area Network (WLAN), a cellular network, a Wide Area Network (WAN), a Metropolitan Area Network (MAN), or a combination of two or more such networks. The network 121 may be wired, wireless, or a combination of both. In one embodiment, the network 121 uses standard communications technologies and/or protocols. Thus, the network 121 may include links using technologies such as Ethernet, Institute of Electrical and Electronics Engineers (IEEE) 802.11, Worldwide Interoperability for Microwave Access (WiMAX), 3G, 4G, Long Term Evolution (LTE), Code-Division Multiple Access (CDMA), Digital Subscriber Line (DSL), cable modems, etc. Similarly, the networking protocols used on the network 121 may include Multiprotocol Label Switching (MPLS), Transmission Control Protocol (TCP), Internet Protocol (IP), TCP/IP, User Datagram Protocol (UDP), Hypertext Transport Protocol (HTTP), Simple Mail Transfer Protocol (SMTP), and/or File Transfer Protocol (FTP). Data exchanged over the network 121 may be represented using technologies and/or formats including Hypertext Markup Language (HTML), Extensible Markup Language (XML), or JavaScript Object Notation (JSON), among other formats. In addition, all or some of links can be encrypted using conventional encryption technologies such as Secure Sockets Layer (SSL), Transport Layer Security (TLS), or Internet Protocol security (IPsec).

The social networking system 130 fundamentally relies upon information representing its users 102A-102N and a set of objects. Users 102A-102N, using the social networking system 130, may add connections to other users or objects of the social networking system 130 to which they desire to be connected, and may also interact with these other users or objects. The users of the social networking system 130 are individuals (e.g. humans), and the objects may include entities (such as businesses, organizations, universities, manufacturers, brands, celebrities, etc.), concepts, or other non-human things including but not limited to a location, an album, an article, a book, a concept, etc.

In some embodiments, the social networking system 130 also allows users to interact with external (e.g., third-party) applications 150 (e.g., websites), external storage 155, and/or external servers 115 (e.g., server end stations).

Based on the stored data about users, objects, and the connections between the users and/or objects, the social networking system 130 generates and maintains a "social graph" in a social graph store 140 comprising a plurality of nodes interconnected by a plurality of edges. Each node in the social graph represents a user or object that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 130 adds, removes, or otherwise modifies edges connecting the various nodes to reflect the interactions.

To provide these functionalities, the embodiment of the social networking system 130 includes an API request server 125, a web server 123, a message server 124, an action logger 126, and a set of data stores 101. This embodiment also includes, within the data stores 101, a social graph store 140 including a node store 142 and an edge store 144, as well as a content store 146, an action log 148, a user profile data store 152, and an object data store 154. In other embodiments, the social networking system 130 may include additional, fewer, or different modules for various applications. Of course, conventional components such as processors, memories, security mechanisms, load balancers, failover servers, management and network operations consoles, and the like are not shown in FIG. 1 so as to not obscure the details of the system.

The social networking system 130 allows its users 102A-102N to communicate or otherwise interact with each other and access content, as described herein. The social networking system 130 stores user profiles in the user profile data store 152. A user profile includes declarative information about the user that was explicitly shared by the user, and may also include profile information inferred by the social networking system 130. In one embodiment, a user profile includes multiple data fields, each data field describing one or more attributes of the corresponding user of the social networking system 130. The user profile information stored in user profile data store 152 describes the users 102A-102N of the social networking system 130, including biographic, demographic, and other types of descriptive information, such as work experience, educational history, gender, relationship status, hobbies, location, other preferences, and the like. The user profile may also store information provided by the user. For example, images or videos provided by the user may also be stored within the user profile. In other embodiments only textual data of the user is stored in the user profile and other data (e.g., images, videos) are stored in multimedia stores and associated with the user (e.g., through associating a user identifier of the user with an image/video identifier of the multimedia content). In certain embodiments, images or videos including or depicting users of the social networking system 130 may be "tagged" with identification information of those users. A user profile in the user profile data store 152 may also maintain references to actions (stored in the user profile or in an action log 148) by the corresponding user performed on content items in a content store 146 and stored in an edge store 144. A user may also specify one or more privacy settings, which are stored in that user's user profile. Privacy settings limit information that the social networking system 130 or other users of the social networking system 130 are permitted to access from that user's user profile.

The web server 123 links the social networking system 130 via the network 121 to one or more user devices 104A-104N by accepting requests for from the user devices 104A-104N and/or transmitting web pages or other web-related content to the user devices 104A-104N, such as image files, audio files, video files, Java applets, Flash, XML, JavaScript, Cascading Style Sheets (CSS), and so forth. The web server 123 in some embodiments is configured to utilize a set of one or more network interfaces 127 to send and receive messages across the network 121. In some embodiments the web server 123 (additionally or alternately) utilizes a message server 124 (e.g., a dedicated server end station, a dedicated software application, etc.) to communicate with the user devices 104A-104N, which is operative to send and/or receive instant messages, queued messages (e.g., email), text and SMS (Short Message Service) messages, or utilize any other suitable messaging technique.

In some embodiments, a message sent by a user to another user by way of the social networking system 130 can be viewed by other users of the social networking system 130, for example, by certain connections of the user (directly connected users in the social graph, other users more than one hop away in the social graph, etc.) receiving the message. An example of a type of message that can be viewed by other users of the social networking system 130 (besides the recipient of the message) is commonly known as a wall post. In some embodiments, a user can send a private message to another user that can only be retrieved by the other user.

When a user takes an action within the social networking system 130, the action may be recorded in an action log 148 by an action logger 126, subject to any privacy settings and restrictions of the user and/or social networking system 130. In one embodiment, the social networking system 130 maintains the action log 148 as a database of entries. When an action is taken on the social networking system 130, the social networking system 130 can add an entry for that action to the action log 148. In accordance with various embodiments, the action logger 126 is capable of receiving communications from the web server 123 about user actions on and/or off the social networking system 130. The action logger 126 populates the action log 148 with information about those user actions. This information may be subject to privacy settings associated with the user. Any action that a particular user takes with respect to another user is associated with each user's profile, through information maintained in a database or other data repository, such as the action log 148. Examples of actions taken in the social networking system 130 that may be stored in the action log 148 include, but are not limited to, adding a connection to another other user, sending a message to the other user, reading a message from the other user, viewing content (e.g., wall posts, images, videos) associated with or created by the other user, attending an event posted by another user, being tagged in photos with another user, etc. In some embodiments, certain actions are described in connection with more than one user, and these actions may be associated with those users as well and stored in the action log 148.

The action log 148 may be used by the social networking system 130 to track other user actions on the social networking system 130, as well as actions on an external application 150 (e.g., website) that are communicated to the social networking system 130. Users may interact with various objects on the social networking system 130, including commenting on posts, sharing links, and checking-in to physical locations via a mobile device, accessing content items in a sequence or other interactions. Information describing these actions is stored in the action log 148. Additional examples of interactions with objects on the social networking system 130 included in the action log 148 include logging in to the social networking system 130, commenting on a photo album, communications between users, becoming a fan of a musician or brand by "liking" a page of the respective entity, adding an event to a calendar, joining a group, creating an event, authorizing an application, using an application, and engaging in a transaction. Additionally, the action log 148 records a user's interactions with advertisements on the social networking system 130 as well as other applications operating on the social networking system 130. In some embodiments, data from the action log 148 is used to infer interests or preferences of the user, augmenting the interests included in the user profile and allowing a more complete understanding of user preferences.

The API request server 125 allows external systems (e.g., an external application 150 of external server 115, and/or user applications 105A of user devices 104A-104N) to access information from or transmit information to the social networking system 130 by issuing API calls. The information provided by the social networking system 130 may include user profile information or the connection information of users, subject to the individual privacy settings of the user. For example, a system (e.g. external application 150) may send an API request to the social networking system 130 via the network 121 to publish a story on behalf of a user, request information about a user (after having been given permission to do so by the user), upload a photograph on behalf of a user, etc. API requests are received at the social networking system 130 by the API request server 125, which then processes the request by performing actions sought by the API requests, determining appropriate responses to the API requests, and transmitting back these responses back to the requesting application 150 via the network 121.

The content store 146 stores content items associated with user profiles, such as images, videos, and/or audio files. Content items from the content store 146 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users or entities, to invite new users to the system or to increase interaction with the social network system 130 by displaying content related to users, objects, activities, or functionalities of the social networking system 130. Examples of social networking content items include suggested connections or suggestions to perform other actions, media provided to or maintained by the social networking system 130 (e.g., pictures, videos), status messages or links posted by users to the social networking system, events, groups, pages (e.g., representing an organization or commercial entity), and any other content provided by, or accessible via, the social networking system 130.

The content store 146 also includes one or more pages associated with entities included in the set of object nodes 143B within the social graph store 140. An entity is a type of object that can be a non-individual user of the social networking system 130, such as a business, a vendor, an organization, or a university. However, in some embodiments of the invention, an entity may represent a celebrity or other well-known individual, and thus an entity object node for a person may exist in the social graph (serving as a "brand" for that individual, and perhaps having an associated page that other users may "like") and also a user node for that same person may also exist in the social graph (serving as a representation for a personal account of that person). A page includes content associated with an entity and instructions for presenting the content to a user of the social networking system 130. For example, a page identifies content associated with the entity's stored content (from the object data store 154) as well as information describing how to present the content to users viewing the page.

In one embodiment, the social graph store 140 includes a node store 142 and an edge store 144. The node store 142, in some embodiments, includes one entry (or user node) for each user in a set of user nodes 143A and one entry (or object node) for each object in a set of object nodes 143B. Each entry in the node store 142 may include a node identifier (e.g., a user identifier and/or object identifier) and may optionally also include some or all of the data described herein as stored in the user profile data store 152 or object data store 154. The edge store 144 stores the information describing connections between users and other objects on the social networking system 130 as edge objects. These nodes and edges are described with further reference to FIG. 2 below.

In the depicted embodiment, the social networking system 130 includes a content creator identification (ID) analysis module 129 and a resource retrieval module 128. The resource retrieval module 128 may be coupled to the set of network interfaces 127 and is utilized by other modules of the social networking system 130 (both illustrated and non-illustrated) to retrieve resources from across the network 121. The content creator ID analysis module 129, in the depicted embodiment, includes an identification module 131 for identifying one or more creators and/or one or more candidate creators of content from a shared resource, and a validation module 132 for verifying that the creators are legitimate and/or for verifying which of the candidate creators are most likely to be the legitimate creator of shared content.

Figure 2:
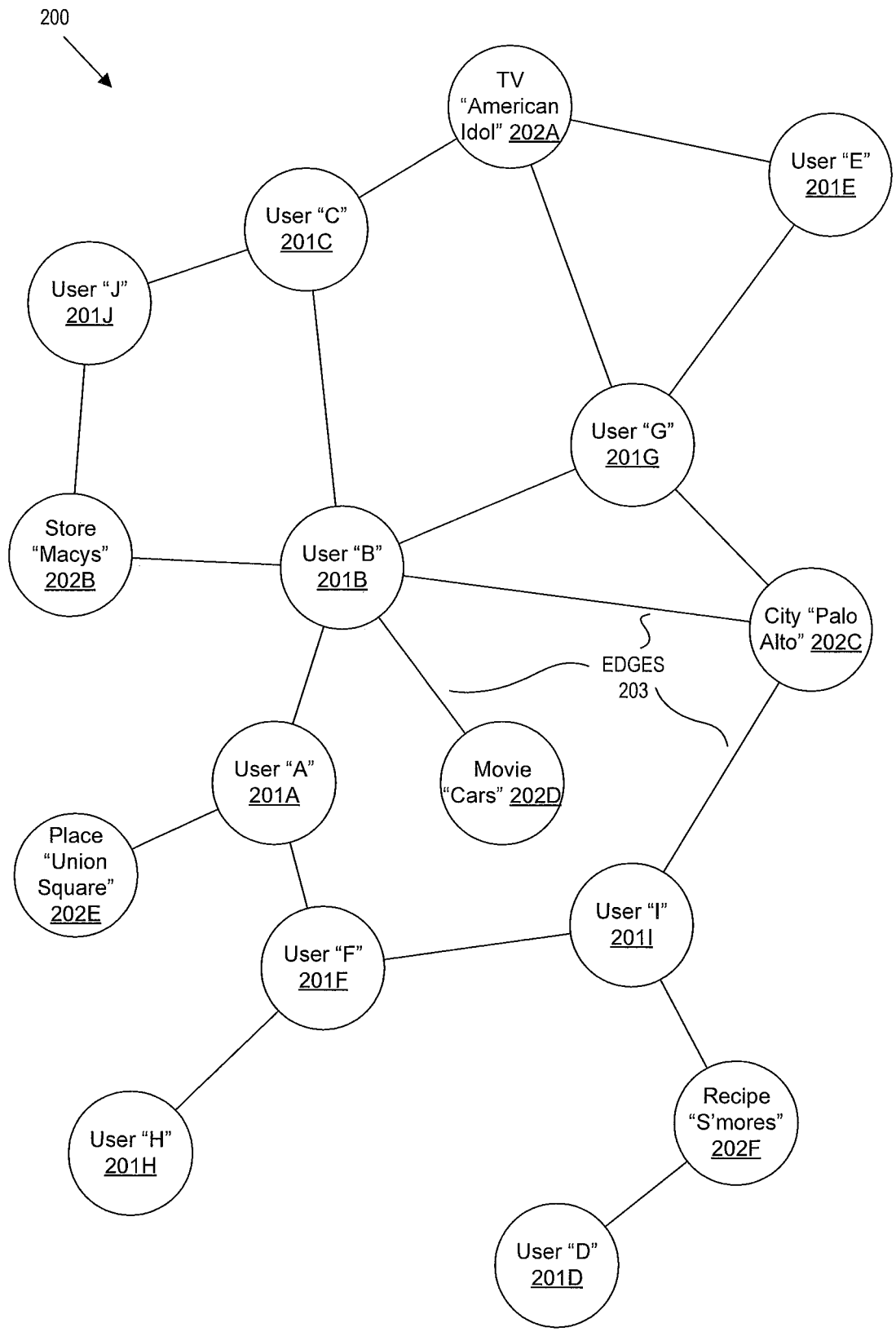
FIG. 2 illustrates an example of a social graph comprising a plurality of user nodes and a plurality of object nodes.

FIG. 2 illustrates an example of a social graph 200 comprising a plurality of user nodes 201A-201J and a plurality of object nodes 202A-202F according to an embodiment of the invention. A user node (e.g., node 201A) of the social graph corresponds to a user of the social networking system. A user node corresponding to a user may comprise information provided by the user and information gathered by various systems, including the social networking system 130. For example, the user may provide his or her name, profile picture, city of residence, contact information, birth date, gender, marital status, family status, employment, educational background, preferences, interests, and other information to be included in or referenced by the user node. Each user node of the social graph may have a corresponding web page (typically known as a "profile page"), which may include a "timeline" of content related to the user displayed according to a time associated with the content. This profile page may be generated dynamically (i.e., constructed upon a request for the profile page and discarded thereafter) or statically (i.e., constructed and saved for later requests, and only reconstructed if necessary). For example, in response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

As described above, an object node (e.g., node 202A) may correspond to an entity, concept, or other non-human thing including but not limited to an animal, a movie, a song, a sports team, a celebrity, a group, a restaurant, a place, a location, an album, an article, a book, a food, an Internet link, or a music playlist. An object node may have a set of one or more "administrative" users for the object node that are granted permission, by the social networking system 130, to create or update the object node (or a page of the object node) by providing information related to the object (e.g., by filling out an online form), causing the social networking system to associate the information with the object node. For example and without limitation, information associated with an object node can include a name or a title of the object, one or more images (e.g., an image of cover page of a book), a web site (e.g., an URL address), and/or contact information (e.g., a phone number, an email address).

An edge between a pair of nodes represents a relationship between the pair of nodes. For example, an edge between two user nodes can represent a friendship between two users. Additionally, an edge may have an associated "label" or "action," that describes the relationship between the nodes. For example, an edge between a user and an object node representing a city may have a label indicating that the user "lives" in the city. An edge between a user and an object node representing a book may have an action indicating that the user has "read" the book.

The social networking system 130, in embodiments of the invention, provides a web page (or other structured document) for an object node (e.g., a restaurant, a non-profit organization, a celebrity). The web page may include one or more selectable buttons (e.g., "like," "check in"). A user (e.g., user 102A) can access the page using a web browser (e.g., user application 105A) of the user device 104A and interact with the page (e.g., select a button within the page, select a link within the page, etc.), causing the user device to transmit to the social networking system a request to create an edge between a user node of the user and an object node of the object, thereby indicating a relationship between the user and the object (e.g., the user checks in a restaurant, or the user "likes" a celebrity, etc.). For example, a user may provide (or change) his or her city of residence, causing the social networking system to create (and or delete) an edge between a user node corresponding to the user and an object node corresponding to the city declared by the user as his or her city of residence.

A degree of separation between any two nodes may be defined as the minimum number of hops required to traverse the social graph from one node to the other. Other possible definitions may include traversal costs for edges to define separation as the path of minimum cumulative cost between nodes. A degree of separation between two nodes can be considered a measure of relatedness between the entities (users or objects) represented by the two nodes in the social graph.

In the example of FIG. 2, social graph 200 may include user nodes 201A-201J, object nodes 202A-202F, and edges 203 between nodes. An edge 203 between a pair of nodes may represent a relationship (or an action) between the pair of nodes. For example, user "G" is a friend of user "B," user "C," and user "E," respectively, as illustrated by the edges between user nodes "G" and "B," between user nodes "G" and "C," and between user nodes "G" and "E." For example, users "C," "E," and "G" watch (or "like") TV show "American Idol," as illustrated by the edges between the "American Idol" object node and user nodes "C," "E," and "G," respectively. Similarly, the edge between the user node "B" and the object node "Palo Alto" may indicate that user "B" declares "Palo Alto" as his or her city of residence. The edge between the user node "B" and the object node "Macy's" may indicate that user "B" likes "Macy's." Of course, social graphs can be much larger than social graph 200 illustrated in FIG. 2, and the number of edges and/or nodes in a social graph may be many orders of magnitude larger than that depicted herein.

As described above, an edge between a pair of nodes may indicate a direct relationship between the pair of nodes. An edge may be directed and connect an ordered pair of nodes. For example, an edge connecting a user node corresponding to a user and an object node corresponding to a city may be directed (i.e., the user lives in the city). An edge may also be undirected, meaning the pair of nodes connected by the edge does not have a particular order. For example, an edge connecting two user nodes can be undirected as the edge indicates a friendship between two users corresponding to the two user nodes.

Connections (i.e., edges) may be added explicitly by a user (e.g., a first user may specifically selects a particular other user to be a friend) or may be automatically created by the social networking systems 130 based on common characteristics of the users (e.g., users who are alumni of the same educational institution).

In addition to establishing and maintaining connections between users and allowing interactions between users, the social networking system 130 provides users with the ability to take actions on various types of items supported by the social networking system 130. These items may include groups or networks (where "networks" refer not to physical communication networks, but rather social networks of people, entities, and objects) to which users of the social networking system may belong, events or calendar entries in which a user might be interested, computer-based applications that a user may use via the social networking system 130, transactions that allow users to buy or sell items via the service, and/or interactions with advertisements that a user may perform on or off the social networking system. Of course, these are just a few examples of the items upon which a user may act on a social networking system, and many others are possible. A user may interact with anything that is capable of being represented in the social networking system 130 or in a third-party website 150 coupled to the social networking system 130 via a network 121.

The social networking system 130 also includes user-submitted content, which enhances a user's interactions with the social networking system 130. User-submitted content may include anything a user can add, upload, send, or "post," to the social networking system 130. For example, a user communicates posts to the social networking system 130 from a user device 104. Posts may include data such as status updates or other textual data, location information, photos, videos, links, music or other similar data, content and/or media. Content may also be added to the social networking system 130 by a third-party through a "communication channel," such as a newsfeed or stream, or through API calls made by the third-party. Content "items" represent single pieces of content that are represented as objects in the social networking system 130. In this way, users of the social networking system 130 are encouraged to communicate with each other by posting text and content items of various types of media through various communication channels, increasing the interaction of users with each other and increasing the frequency with which users interact within the social networking system 130.

By identifying content creators for resources shared between users, the social networking system is able to recommend additional content from or actions related to the content creator. In one embodiment, the social networking system automatically publishes or otherwise shares a preview of a resource with users that follow, like, or otherwise associated with the creator of the content within the social network in response to the resource being shared a threshold number of times. One example of automatic creator identification of content to be shared in a social networking system is presented through the use of user interface elements in FIG. 3A, FIG. 3B, FIG. 4A, and FIG. 4B.

Figure 3A:
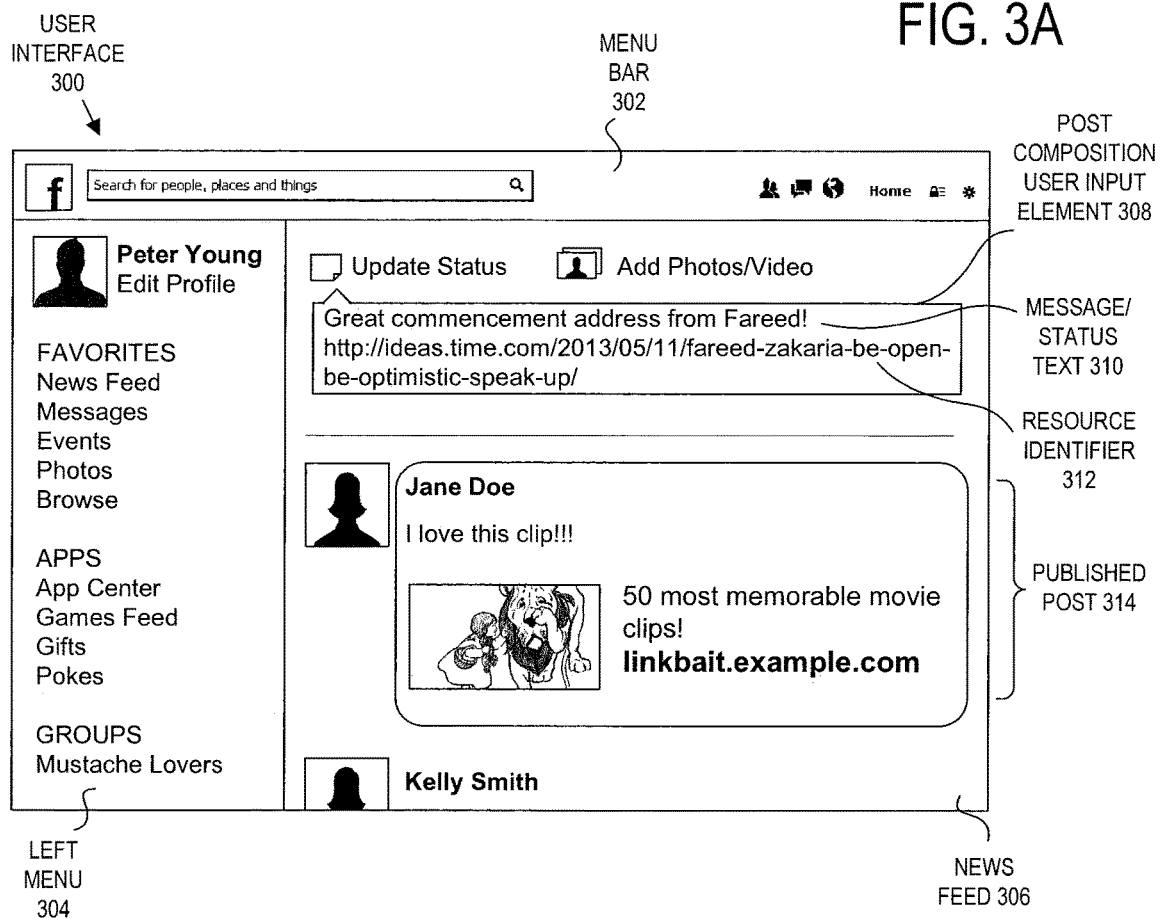
FIG. 3A illustrates a user interface of a social networking system including a post composition user input element allowing a user to share message text and a resource.

FIG. 3A illustrates a user interface 300 of a social networking system 130 including a post composition user input element 308 allowing a user to share message text 310 and a resource according to an embodiment of the invention. The depicted user interface 300 is presented within a user application (e.g., 105A) of a user device (e.g., 104A) and includes several parts useful to allow users to access the functionalities of the social networking system. The top menu bar 302 includes a logo of the social networking system, a search box allowing a user to input text to search for people, places, things, etc., and a set of icons allowing the user to view messages and notifications, edit system and privacy settings, and log out of the system. The left menu 304 includes an icon or image of the user, the user's name, a link to allow the user to edit the user's profile information, and a set of links to parts of the social networking system, including a link to view the news feed 306, messages sent between users of the social networking system, events, photos, a list of applications to run in or in concert with the social networking system, games, gifts, user groups, etc. The depicted news feed 306 includes a set of one or more published posts 314. The depicted published post 314 is a user-generated post, and includes a photograph of the user that created the post, message text of the post, and a preview of content from a resource shared by the user. Other types of published posts 314 also exist, including notifications about events, stories generated by applications, advertisements, photographs and/or video uploaded by the user, etc.

The user interface 300 also includes a post composition user input element 308 allowing the logged-in user (e.g., a user named "Peter Young") to create a post and/or submit photographs or video to the social networking system. In the depicted embodiment, the post composition user input element includes a "textarea"-type user input element allowing the user to input text or other content, which will then be used to create post for other users of the social networking system to view depending upon the privacy settings of the user. In this embodiment, the user has input a message (or status) text 310 of "Great commencement address from Fareed!" along with a resource identifier 312 (i.e., a URL) for a web page hosted by the domain "time.com" including content that is a transcription of a commencement address. When the user has finished composing the post, the user may press an "enter" or "return" keyboard button, click a button, or perform some other user input action, which causes the user device 104A to transmit a sharing message to the social networking system 130 including a representation of the message text 310 and the resource identifier 312. In an embodiment, the sharing message is a "POST" HTTP request method message transmitted to the social networking system 130, but in other embodiments the sharing message can be a "GET" HTTP request method message, an API call made to the API request server 125 of the social networking system 130, or some other communications method known to those of skill in the art.

Figure 3B:
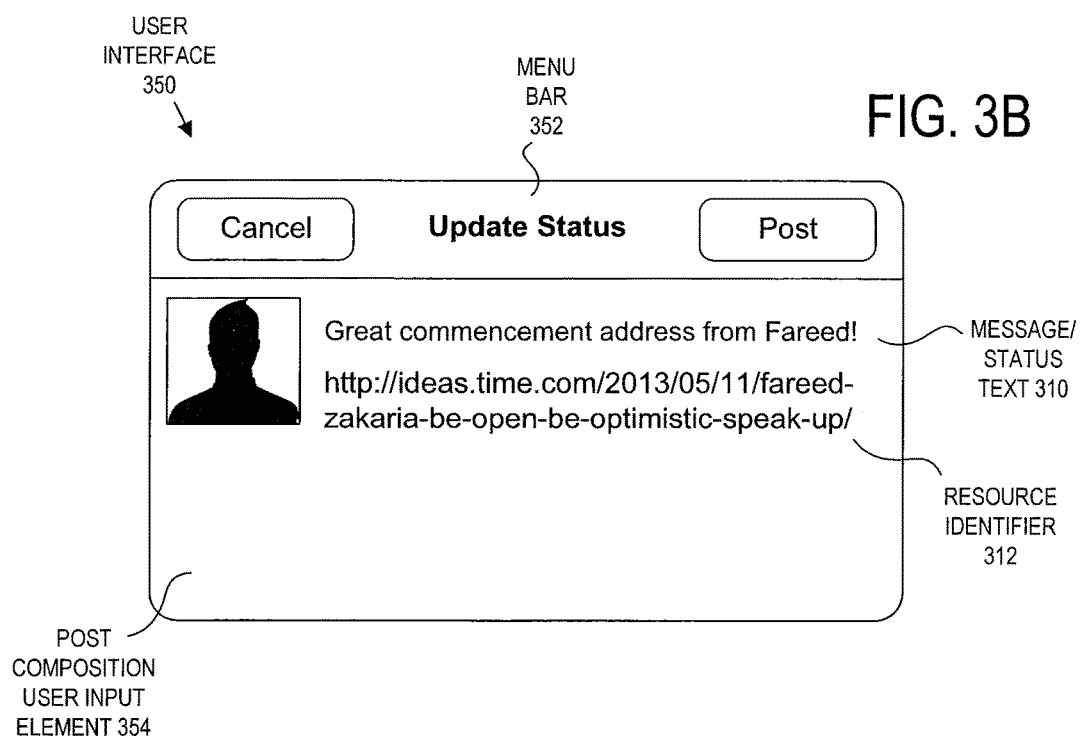
FIG. 3B illustrates a condensed user interface of a social network system including a post composition user input element allowing a user to share message text and a resource according to an embodiment of the invention.

FIG. 3B illustrates a condensed user interface 350 of a social network system 130 including a post composition user input element 354 allowing a user to share message text 310 and a resource 312 according to an embodiment of the invention. In an embodiment, the user interface 350 is used within a standalone social networking system application of a mobile device, though the user interface in other embodiments can be used in other applications and/or for other types of computing devices. This user interface 350 includes a menu bar 352 having a title ("Update Status"), a cancel button, and a post button that the user selects when the post composition is complete. The user interface 350 also includes a post composition user input element 354 including an icon or photograph of the user, and a large area for the user to input text and/or other content for a post. In the depicted embodiment, the user has input the same message text 310 and the same resource identifier 312 as in FIG. 3A.

Upon receipt of the sharing message, the content creator ID analysis module 129 determines that a resource identifier exists (i.e., URL) within the sharing message. This determination may occur based upon the resource identifier having been detected by the user application 105A and tagged as such within the sharing message, or detected by the content creator ID analysis module 129 of the social networking system 130. This detection may utilize a matching algorithm looking for a particular format of a text string adhering to a URL pattern, such as a regular expression. Upon determining that the resource identifier exists, the content creator ID analysis module 129 may first check a cache in data stores 101 to determine if the resource has been previously retrieved and/or if a creator has previously been identified for the content of the resource. If not, the content creator ID analysis module 129 instructs the resource retrieval module 128 to acquire the resource identified by the resource identifier. The resource may include one or more of a web page, image, video, style sheet, client-side script (e.g., JavaScript), etc.

Figure 4A:
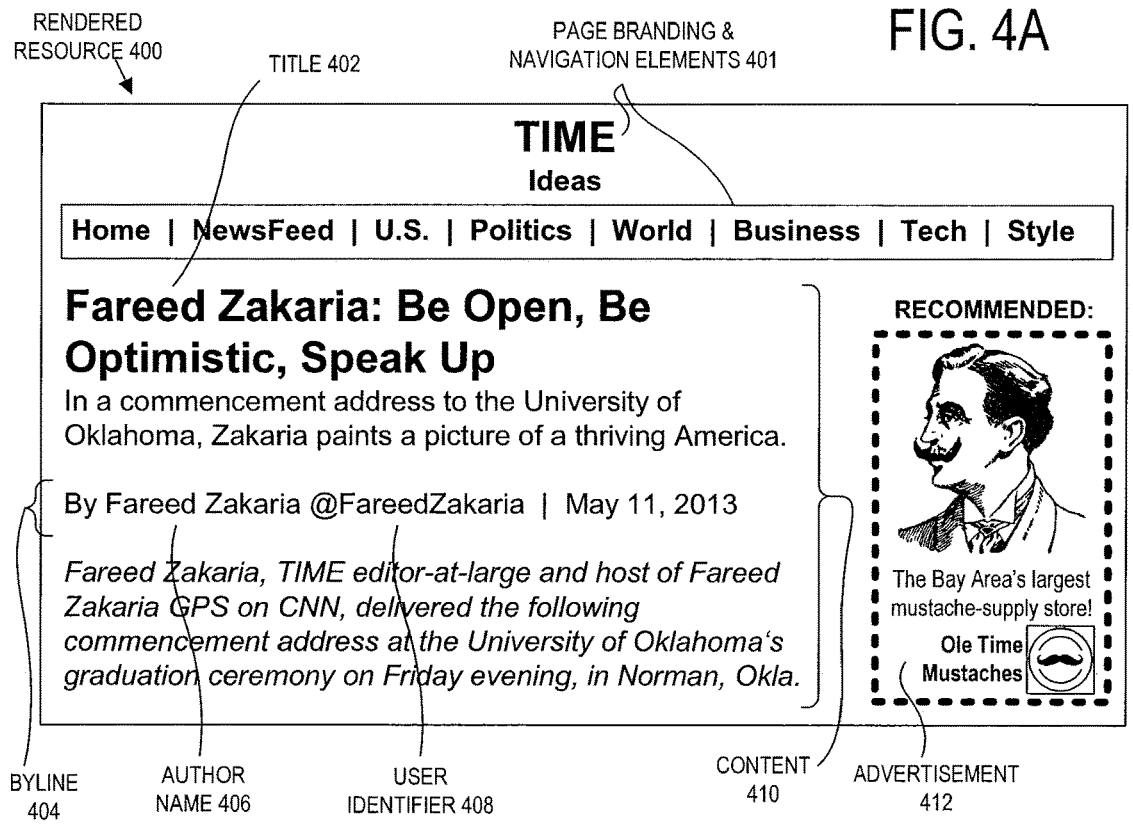
FIG. 4A illustrates the resource including content to be shared through use of the post composition user input element 354 of either FIG. 3A or FIG. 3B as a rendered resource 400 according to an embodiment of the invention.

FIG. 4A illustrates the resource including content to be shared through use of the post composition user input element 354 of either FIG. 3A or FIG. 3B as a rendered resource 400 according to an embodiment of the invention. This view of the resource is as a rendered resource 400, which is how an application (e.g., a web browser, social network application) will present the resource to a user, but the resource itself may include other data and metadata including HTML code (e.g., HTML elements, metadata, etc.), CSS code, JavaScript code, etc. The rendered resource 400 includes the content 410 as well as other items, including page branding and navigation elements 401 and advertisements 412. The depicted content 410 includes a title 402, a summary lead, an article (not depicted here), and a byline 404 including an author name 406 (e.g., "Fareed Zakaria"), a user identifier 408 (e.g., "@FareedZakaria," which may in some embodiments be a hyperlink leading to another page associated with the author, such as a link to a Twitter® page of the author), and a date.

Upon retrieving the resource, the identification module 131 of the content creator ID analysis module 129 will analyze the resource to automatically identify a creator of the content or one or more candidate creators of the content. In an embodiment, the content creator ID analysis module 129 maintains a list of instructions for identifying a creator for resources from particular domains. By way of example, the content creator ID analysis module 129 may include a stored set of instructions that for pages from a particular domain (and perhaps also matching one or more other logical conditions indicating whether a creator can be found using the stored instructions for a particular resource) indicating that the identification module 131 is to parse the resource to identify a value of a particular metadata element. For example, a stored instruction for the domain "time.com" may indicate that a value of an "article:author" or "article:publisher" meta tag (from the Open Graph Protocol specification of Facebook) within the <head> portion of the HTML page indicates the creator (author or publisher, respectively) of the content. This value may include a text string of the creator, or a link to a web page of the creator, which may be internal or external to the social network. This list of instructions, which may be for "high trust" domains, may be manually entered by an administrator or automatically learned—when a machine learning or statistical algorithm can determine that a particular set of instructions is extremely likely to identify a true creator of content for a domain. For example, the instructions and the domain may be inserted into the list based upon a historic statistical analysis of previous creator identifications. Other sets of instructions may include looking for other types of elements within the HTML page, such as the value of an title element, heading element (e.g., h1, h3, etc.), another type of meta tag such as those originated by third parties (e.g., Twitter, WordPress, etc.). Other sets of instructions may also identify other page elements that may identify the creator, such as instructions to identify the byline 404 and select the portion of the page where the author name 406 string is placed. Similarly, other sets of instructions may identify the creator by detecting a user identifier 408, and translating the user identifier 408 using a local mapping or perhaps by requesting another page associated with the user identifier 408 (e.g., requesting a Twitter page or data associated with the user identifier 408).

In some embodiments, the "high trust" domain list of instructions is used by the identification module 131 to identify the creator. In other embodiments the identification module 131 performs other tasks to identify one or more candidate creators.

For example, in an embodiment for some "medium trust" domains, a set of candidate creators is extracted by identifying known entities (e.g., from the object nodes 143B of the social graph store 140 or another database) within portions of the resource. In some embodiments, the entire resource is scanned for known entities, but in other embodiments, only a set of page elements are examined—perhaps one or more of the above-identified page parts such as title elements, heading elements, meta tags, etc. Each known entity that is found within the resource is saved as a candidate entity. Domains placed into the "medium trust" set of domains may be those domains not consistently identifying creators throughout their pages, or those domains where machine learning or statistical algorithms are unable to consistently identify a true creator of the content. In some embodiments, the "medium trust" set of domains include any domain not appearing in the "high trust" list.

With the set of candidate creators generated by the identification module 131, the validation module 132 may examine a set of one or more items of user-generated content (e.g., posts, comments, etc.) related to the resource made by other users within the social networking system 130. For example, the set of items of user-generated content may include all message texts (e.g., 310) made by other users when sharing the resource, and/or may include all comments made by other users in response to a post sharing the resource. The validation module 132 uses the set of user-generated content items to determine if, and how often, the candidate creators are mentioned in the set of user-generated content. The validation module 132 may utilize one or more thresholds to indicate whether the candidate creator is to be deemed a creator, not a creator, and/or an associated creator (i.e., falling between the "creator" and "not a creator" thresholds). For example, if a candidate creator is included in more than a high threshold (e.g., 66%) of the user-generated content items, the validation module 132 may deem that candidate creator a creator; if the candidate creator is included in more than a low threshold but less than the high threshold (more than 10%, but less than 66%) the validation module 132 may deem the candidate creator an associated creator; if the candidate creator is included in less than the low threshold, the candidate creator may be deemed not to be a creator. In some embodiments, the validation module 132 only differentiates between creators and non-creators, and thus may only utilize one threshold.

In some embodiments, a "low trust" domain procedure may also be utilized by the validation module 132. A domain deemed to be "low trust" may be a domain not previously analyzed before by the validation module 132 or may be a domain simply not in the list of "high trust" domains. In these embodiments, no set of candidate creators is generated. Instead, the validation module 132 simply performs analysis of the set of user-generated content items to identify known entities.

With a creator identified (by any of the "high trust," "medium trust," or "low trust" domain procedures), the content creator ID analysis module 129 will identify a page or content within the social network associated with the creator. In an embodiment, the content creator ID analysis module 129 searches its set of object nodes 143B in the social graph store 140 to identify an object node 143B of the creator. This object node 143B then can be utilized to construct a link to a page of the creator within the social network. With this information, the user's original sharing message is processed and a post is published in the social networking system.

Figure 4B:
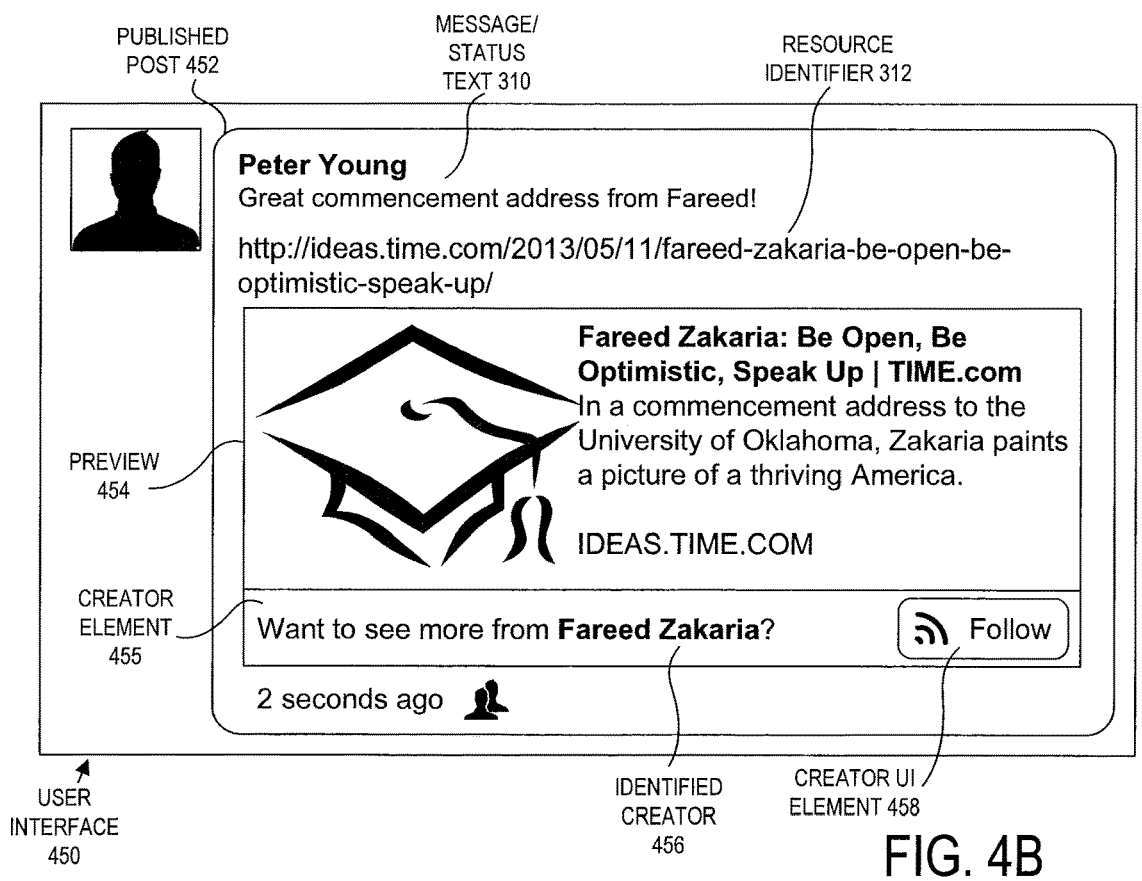
FIG. 4B illustrates a published post shared in the social networking system sharing the resource of FIG. 4A and identifying the creator of the content according to an embodiment of the invention.

FIG. 4B illustrates a post 425 published in the social networking system and sharing the resource of FIG. 4A and identifying the creator of the content according to an embodiment of the invention. The published post 425 may appear on a news feed 306 of the user and one or more other users of the social network, such as the "friends" of the user or "friends-of-friends" of the user, as dictated by the post visibility settings of the user's privacy profile and/or social network configuration settings. The published post 425 includes the user's icon/photograph, the user's name, the message/status text 310, optionally the resource identifier 312, and a preview 454 of the resource. The preview 454 includes the title 402 of the content 410, summary text, and a creator element 455 including the identified creator name 456 and a creator user interface element 458 allowing the user to view additional content from the creator or become associated with the creator within the social networking system or another network service. In the depicted embodiment, the creator user interface element 458 includes a "follow" button. When the user selects this button, a message is sent to the social networking system 130 that causes it to create a connection (i.e., edge) between the user node of the user and the object node for "Fareed Zakaria" in the social graph store 140. In some embodiments, the connection will cause the user's news feed to include content from the "Fareed Zakaria" page of the social networking system 130. In some embodiments, the creator user interface element 458 may include a button or link leading the user to the page of "Fareed Zakaria" or otherwise enabling the user to view other content from Fareed Zakaria.

Figure 5A:
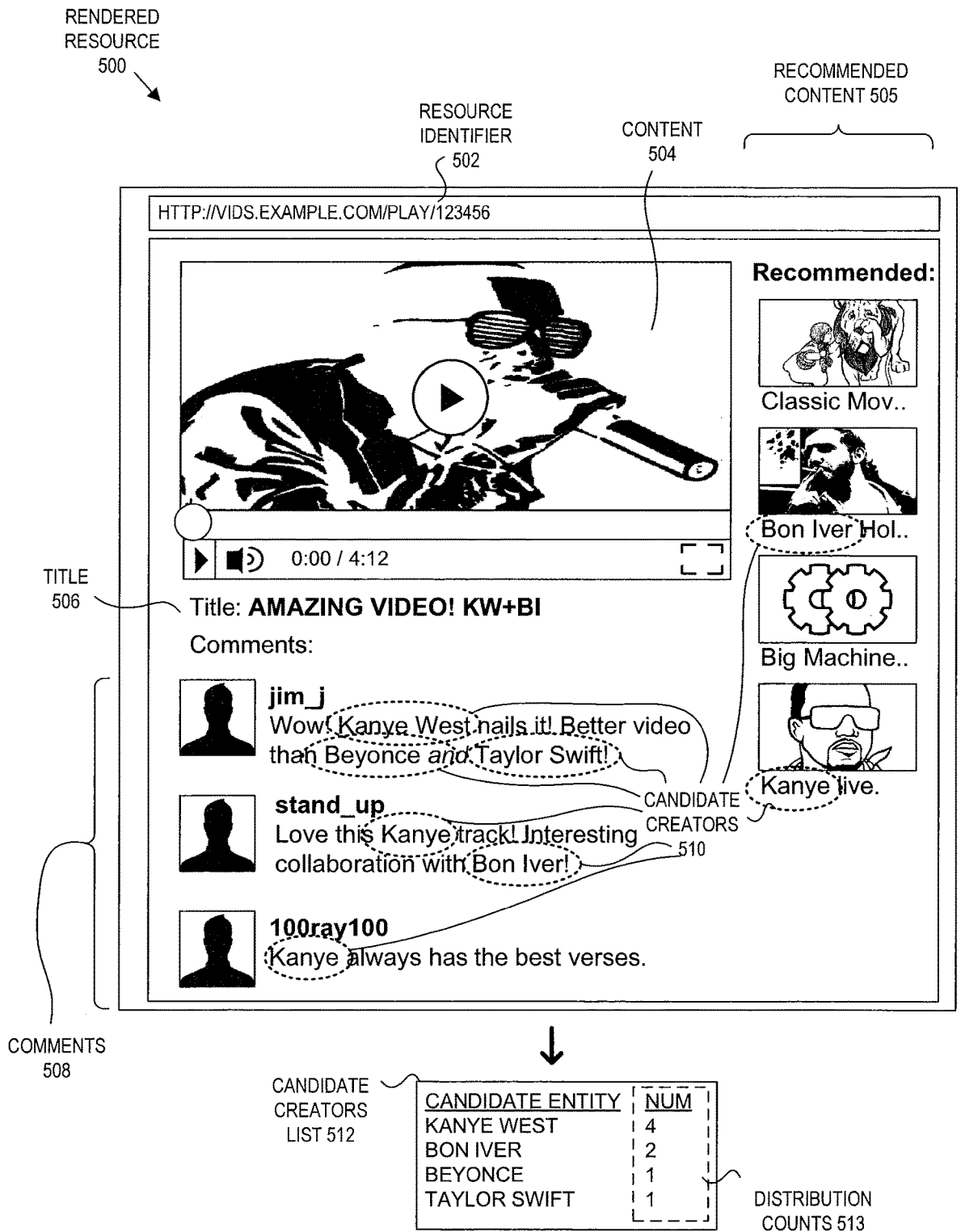
FIG. 5A illustrates a rendered resource including multimedia content lacking explicit creator signals to be shared within a social networking system according to an embodiment of the invention.

FIG. 5A illustrates a rendered resource 500 including multimedia content 504 lacking explicit creator signals to be shared within a social networking system according to an embodiment of the invention. The rendered resource 500, which is identified by resource identifier 502, may be a resource such as an HTML webpage that has been rendered by a user application (e.g., 105A) including but not limited to a web browser or social networking application. The resource may be a static resource (e.g., a simple HTML file stored and served by a web server 123) or may be dynamically generated (e.g., an HTML file generated by the web server 123 for a request using a language such as PHP, Ruby, Perl, Python, etc.).

Rendered resource 500 includes a user interface location displaying the resource identifier 502, the content 504 (e.g., a movie), a set of recommended content 505 items (e.g., thumbnail images of other movies, brief text descriptions of the other movies, etc.), a title 506 of the content 504, and a set of comments 508 made by users of the website hosting the resource that may or may not be users of the social networking system 130.

Figure 5B:
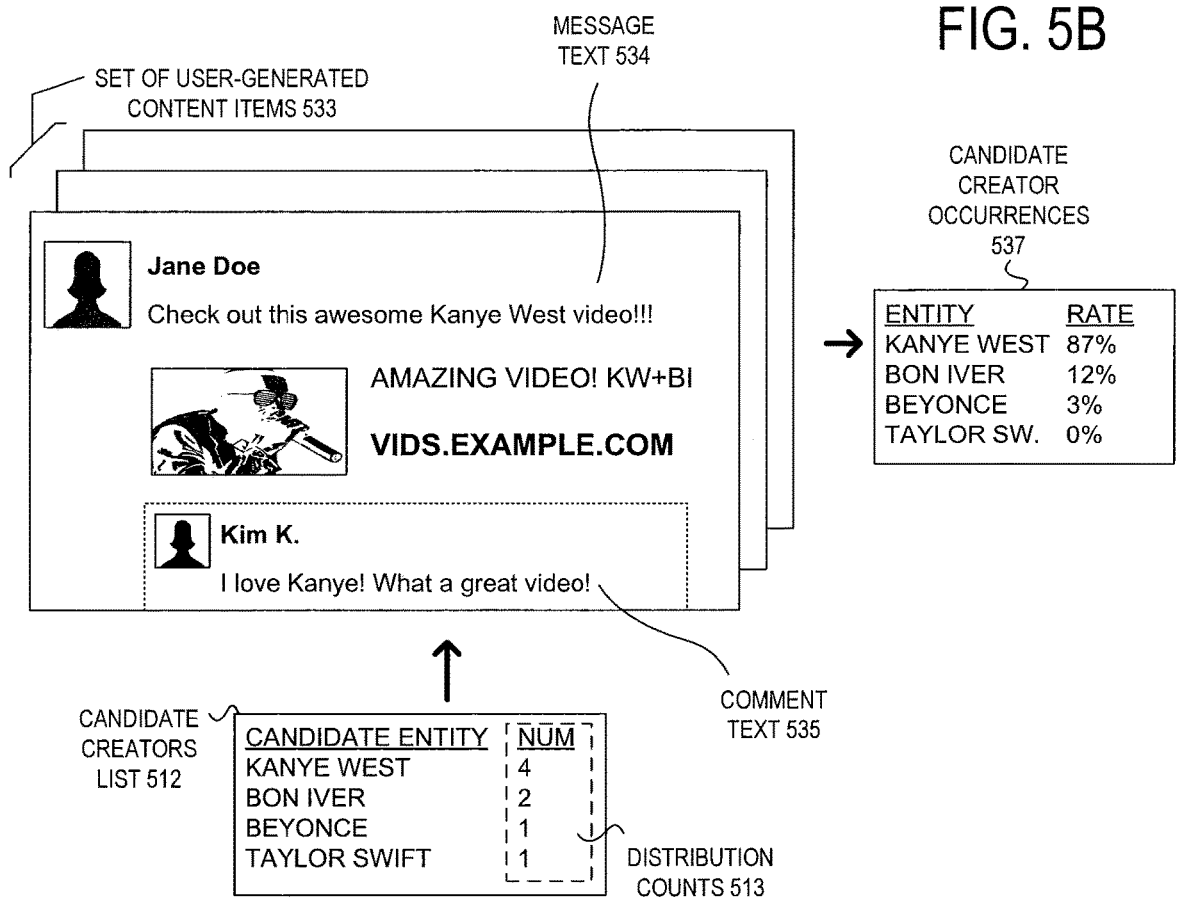
FIG. 5B illustrates candidate creator validation analysis of a plurality of posts including user-submitted content including or related to the shared resource of FIG. 5A according to an embodiment of the invention.

In the depicted embodiment of FIG. 5A, the resource does not include explicit creator signals such as meta tags indicating authorship of the content 504 or any known (or easily determinable) HTML element including authorship information. In such scenarios, certain embodiments of the invention may utilize one of the "medium trust" or "low trust" analysis procedures as described above to determine the creator of the content 504. FIG. 5A and FIG. 5B, however, will illustrate an embodiment of the invention utilizing the "medium trust" analysis. When a user device 104A of a user 102A of the social networking system 130 transmits a sharing message to the social networking system 130 including the resource identifier 502, the social networking system 130 will retrieve the resource and begin a content creator identification analysis procedure. Following the "medium trust" analysis, the social networking system 130 will first identify a set of candidate creators from the resource. This identification may include scanning through the source code of the resource and/or scanning through a rendered resource 502 (the social networking system 130 need not actually display a rendered resource 502; techniques exist in the art to "render" or construct a page in memory for analysis purposes) seeking text strings that appear likely to be entities. In some embodiments, the text of the resource is compared to a list of entities known by the social networking system 130. In this example, the candidate creator analysis may identify several candidate creators 510 from the resource—some from the recommended content 505 items (e.g., one for "Bon Iver" and one for "Kanye"), and some from the set of comments 508 (e.g., several for "Kanye West" or "Kanye," one for "Bon Iver," one for "Beyonce," and one for "Taylor Swift"). However, in other embodiments and scenarios there may be many other page locations where candidate creators 510 may be found including but not limited to meta tags, other non-visible metadata, the page title, content in heading tags, paragraph tags, table tags, etc. These candidate creators 510 may be normalized (e.g., combine "Kanye" and "Kanye West" as simply the proper "Kanye West") and placed into a candidate creators list 512. In some embodiments, the candidate creators list 512 also includes a set of corresponding distribution counts 513 indicating how many times within the resource the particular candidate creator was found. For example, the term "Kanye West" was found four times, whereas the term "Taylor Swift" was found one time. The "medium trust" analysis continues with FIG. 5B, which illustrates candidate creator validation analysis of a plurality of posts including user-submitted content including or related to the shared resource of FIG. 5A according to an embodiment of the invention.

In FIG. 5B, the social networking system 130 analyzes a set of one or more user-generated content items 533 (e.g., posts) made by other users of the social networking system 130 that include the resource identifier 502 or are made in response to a post having the resource identifier 502. In an embodiment, the social networking system 130 analyzes the message text 534 of posts made by users that include the URL (i.e., resource identifier 502) of the content 504 and/or the comment text 535 of comments made in response to posts including the URL. This analysis may be limited to only looking for entities in the candidate creators list 512 previously generated (as in a "medium trust" analysis), or may include looking for all known entities. In some embodiments, the analysis includes looking for all known entities in the message text 534 and the comment text 535, while all found entities existing in the candidate creators list 512 will be given additional weight in the analysis. The weight may be the same for each entity appearing in the candidate creator list 512 or may be different based upon the corresponding distribution counts 513 of the entities in the candidate creators list 512 (e.g., giving those entities having higher distribution counts 513 a higher weight).

Accordingly, the set of user-generated content items 533 and possibly the candidate creators list 512 is utilized to generate a set of candidate creator occurrences 537. In the depicted embodiment, the set of user-generated content items 533 were analyzed for evidence of the entities in the candidate creators list 512. In 87% of the set of user-generated content items 533, the entity "Kayne West" was included. In 12% of the set of user-generated content items 533, the entity "Bon Iver" was included.

Depending upon configuration, one or more thresholds may be configured to determine which, if any, of the candidate creator occurrences 537 will be deemed the creator of the content. In an embodiment, a first threshold is set as a percentage requirement (e.g., 50% or 75%) to indicate that those entities having an appearance rate above the first threshold will be deemed the creator. In some embodiments, the first threshold is an exclusive threshold, and thus if there is more than one entity satisfying the first threshold, neither will be deemed to be the creator. Assuming a first threshold of a percentage requirement of 50%, in the depicted embodiment precisely one entity satisfies the first threshold—"Kanye West," which has an 87% appearance rate. In other embodiments, the first threshold may comprise a multiplier (e.g., 3×, or 10×) indicating a difference between the largest appearing entity and the second-largest appearing entity that must exist for the largest appearing entity to be deemed the creator. Assuming a first threshold that is a multiplier of 3×, in the depicted embodiment the entity "Kanye West" will be deemed the creator, as the appearance rate of 87% is more than three times larger the second largest appearance rate of 12% (i.e., 0.12×3=0.36, which is still smaller than 0.87). In some embodiments, the first threshold includes both a percentage requirement (e.g., 50%) and a multiplier (e.g., 3×).

In some embodiments, the social networking system 130 also utilizes a second threshold to indicate entities that may be an associated creator (i.e., falling between the "creator" and "not a creator" thresholds). For example, a second threshold may comprise a percentage requirement of greater than 10%, but less than 50%. In the depicted embodiment, the entity "Bon Iver" satisfies such a second threshold, as it has an appearance rate of 12% that falls between 10% and 50%. In some embodiments, the social networking system 130 also utilizes a third threshold to indicate that any entities having an appearance rate less than a certain rate (e.g., 10%) will be deemed as not being creators. Of course, other systems may utilize more or fewer thresholds, and/or different combinations of conditions within each threshold.

Figure 5C:
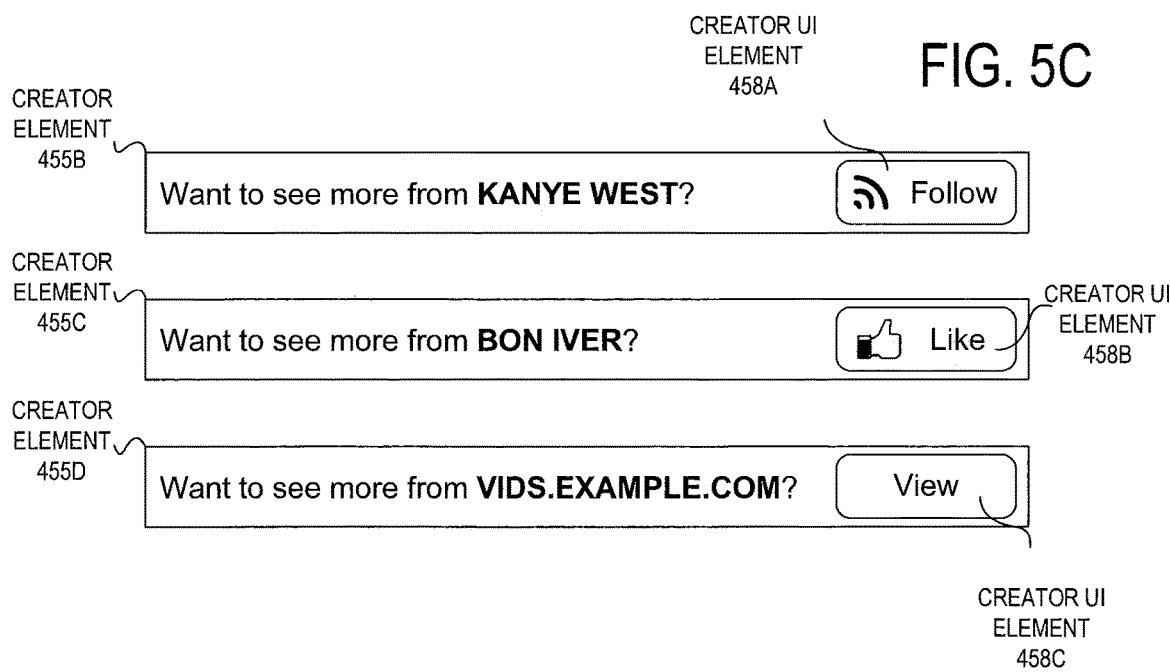
FIG. 5C illustrates several creator recommendation user interface modules for use in a published post sharing the resource of FIG. 5A according to an embodiment of the invention.

Having determined a creator of the content 504, the social networking system 130 shares the original user's user-generated content (e.g., the user's post) with a set of other users of the social networking system 130 (e.g., as a published post appearing in the other users' News Feed). Additionally, social networking system 130 may include user interface elements to the set of other users to identify the determined creator, interact with the determined creator, find additional content from the determined creator, or create a connection with the determined creator within the social networking system 130. FIG. 5C illustrates several creator recommendation user interface modules for use in a published post sharing the resource of FIG. 5A according to an embodiment of the invention.

Assuming the determined creator is the entity "Kanye West," a creator element 455B may be included in or with the user's published post (see, for example, published post 452 of FIG. 4B). This creator element 455B identifies the determined creator ("Want to see more from KANYE WEST?") and also includes a creator UI element 458A button allowing users, upon selecting the button, to create a connection with the creator within the social network. In an embodiment, the connection is formed by generating an edge between a user node of the requesting user and an object node of the entity within the social graph of the social networking system. In an embodiment, upon a user selecting the creator UI element 458A-458C, the user's user device transmits a message to the social networking system 130 indicating the user's desire to become associated with the creator.

In some embodiments, the social networking system 130 may include a creator element 455C within the user's published post that identifies an "associated" creator of the content. In some embodiments, this type of creator element 455C is displayed when the user viewing the published post is already connected to the creator entity, though in other embodiments this creator element 455C may be displayed even when the user is not connected to the creator entity in the social networking system 130. This creator element 455C includes a creator UI element 458B allowing the user to "Like" the entity.

As described herein, in some embodiments of the invention the term creator may also refer to a person or entity that publishes content, and may or may not be an author of the content. For example, in FIG. 5A the social networking system 130 may have an entity for "vids.example.com," which could be a website of an organization that publishes movies and that has an object node 143B and page in the social networking system 130. In this example, the social networking system 130 might recognize "vids.example.com" (based upon the resource identifier 502) as a candidate creator 510, and thus the social networking system 130 may include a creator element 455D with the user's published post that identifies this "distributor" creator. In the depicted embodiment, the creator element 455D includes a creator UI element 458C allowing the user to view additional content from the "vids.example.com" entity by visiting a page within the social network for that entity. Of course, any one or more of the creator UI elements 458A-458C may be used in various embodiments depending upon the configuration of the social networking system 130. In another embodiment, a creator UI element allows a user to visit the creator's webpage (e.g., external to the social networking system 130 or other network service), subscribe to a feed associated with the creator, or otherwise view content from or information about the creator.

Figure 6:
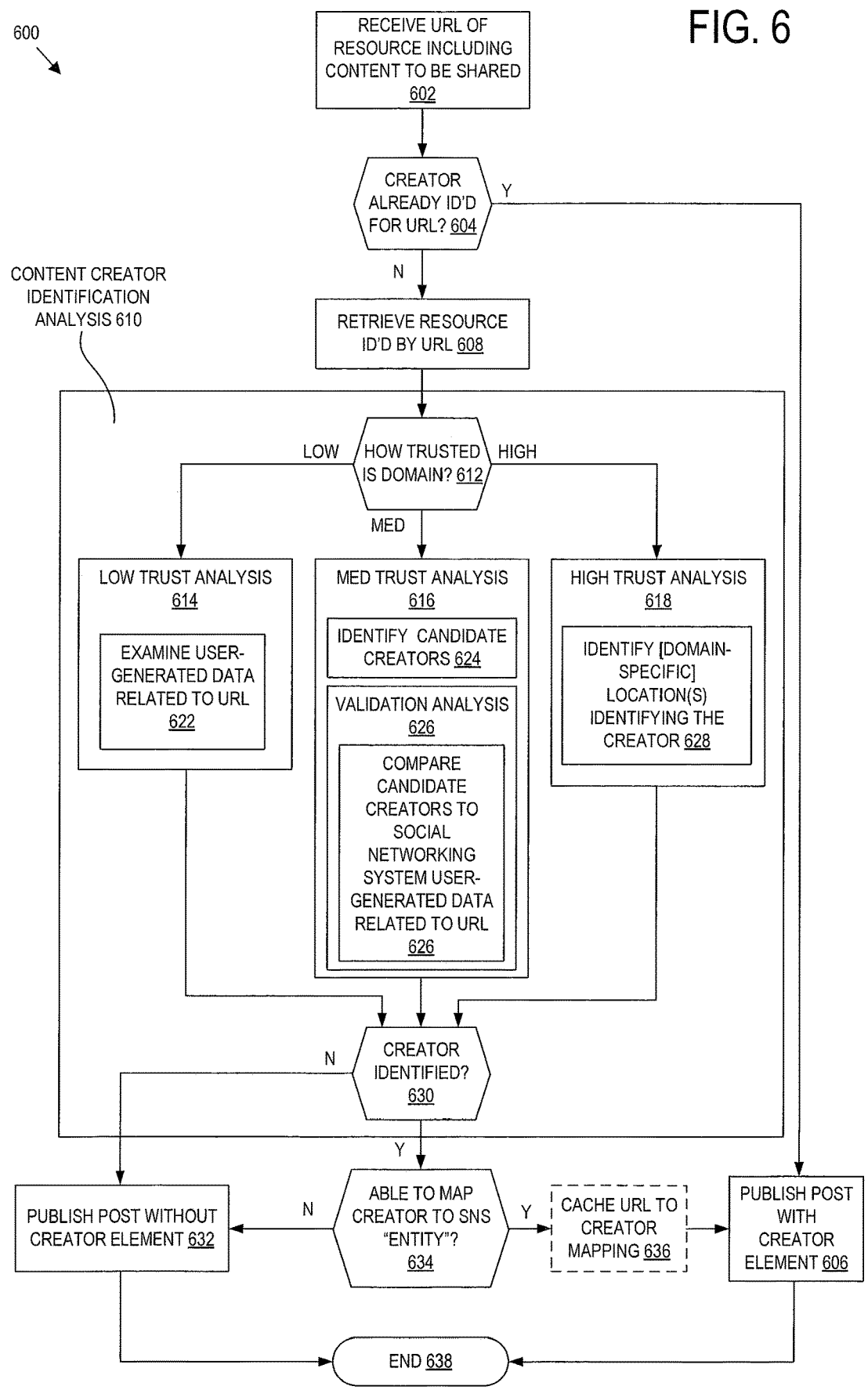
FIG. 6 illustrates a flow for automatic creator identification of content to be shared in a social networking system including different trust analysis methods according to an embodiment of the invention.

FIG. 6 illustrates a flow 600 for automatic creator identification of content to be shared in a social networking system 130 (or other network service) including different trust analysis methods according to an embodiment of the invention. The illustrated flow 600 begins with the social networking system 130 receiving 602, from a user device of a user of the social networking system, a URL of a resource that includes content to be shared in the social networking system. In an embodiment, the URL is received within a sharing message transmitted by the user device responsive to the user creating a post including the URL and optionally message text.

At 604, if a creator has already been identified for the URL, the social networking system 130 may publish 606 the user's post with a creator element 455, thereby allowing the other users viewing the published post to easily find and/or become associated with the presence of the creator within the social network. The social networking system 130 may make this determination based upon maintaining a cache of identified creators with resource identifiers, and performing a lookup in this cache with a received URL to determine if a cached entry exists.

If, at 604, a creator has not been identified for the URL, the process continues with retrieving 608 the resource identified by the URL. In an embodiment, the social networking system 130 utilizes a resource retrieval module 128 and thereby a set of network interfaces 127 to transmit a request to an external server 115 identified by the resource identifier, and receiving a response from the external server 115 including the resource. The resource retrieval module 128 may perform this task by issuing cURL or wget data transfer commands to an operating system.

In an embodiment, upon acquisition of the identified resource a content creator identification analysis 610 procedure is begun. In this embodiment, social networking system 130 determines 612 how trusted the domain providing the received resource is. This determination may be made upon a preconfigured list of trusted/not trusted domains, several lists or scores indicating the trustworthiness of domains, etc. Generally, the trustworthiness of a domain indicates or reflects how likely a creator, as directly indicated (e.g., announced, or stated) by the resource, is actually a true creator of the content. For example, if the social networking system 130 verifies that, for a certain number (e.g., 10, 50, 100) of consecutive retrieved resources, each such resource both positively indicates a creator (e.g., using a meta tag or a uniform creator location in an HTML tag) and that the indicated creator is later deemed or found to be correct, then the domain may be treated as a "highly" trusted domain. For those domains not meeting a "highly" trusted domain criterion, a social networking system 130 may also include logic for determining whether the domain is a "medium" trusted domain. In various embodiments, this logic may include determining whether a creator has ever been identified through automatic/programmatic methodologies, or may define a lower number of consecutive retrieved resources (as compared to a "highly" trusted domain criterion) or allow for non-consecutive retrieved resources to be deemed correct. In some embodiments, the social networking system 130 may include a "low" trust domain criteria, which may be a catchall for those domains not satisfying either the "high" or "medium" criteria. Although this depicted embodiment outlines three separate processes for domains of varying trustworthiness, other embodiments may utilize only one analysis procedure (any of these three) or may utilize two different procedures.

If the domain is found to be of "low" trustworthiness, a low trust analysis 614 is chosen, which simply examines other user-generated data posted to the social networking system 130 by other users that is related to the URL. In an embodiment, this may include examining 622 and matching the user-generated data (e.g., message text from posts including the URL and/or comments upon such posts) against a list of known entities having a presence in the social networking system, and determining which of those known entities may qualify as the creator, as described herein.

If the domain is found to be of "medium" trustworthiness, a medium trust analysis 616 is chosen, which first includes identifying a set of candidate creators 624 based upon the retrieved resource, and then performing a validation analysis 626 including comparing the set of candidate creators to user-generated data posted to the social networking system 130 by other users that is related to the URL. The medium trust analysis 616 further comprises determining if a creator has been identified and if so, selecting that candidate creator as the creator of the content.

If the domain is found to be of "high" trustworthiness, a high trust analysis 618 is chosen that includes an identification 628 analysis. In an embodiment, the identification 628 comprises searching for and identifying a particular, known aspect of the resource to identify the creator. In an embodiment, this includes searching for values of one or more known meta tags within the page. In other embodiments, this includes searching for values within defined locations within the resource, perhaps as identified by the content of a particular HTML element. In some embodiments, the social networking system stores and maintains instructions for identifying the creator for each different domain. In such embodiments, the identification 628 comprises looking up the logic for the domain of the URL, and using the logic to identify the creator from the resource.

At decision block 630, if a creator has not been identified, the flow 600 continues with publishing 632 the post of the user without a creator element. However, if a creator has been identified 630, the flow 600 continues with attempting to map 634 the identified creator with an entity in the social networking system 130. In an embodiment, this includes performing a lookup in the social graph store 140 for an object node 143B that has a name or identifier matching the identified creator text from the resource. Alternatively, this includes performing a lookup in another network service, e.g., using a creator name or handle identified within the content, such as creator name 456. If a match cannot be found, the flow 600 continues with publishing the user's post without any creator element 632. If a match is found, the flow 600 optionally continues with updating 636 a cache of the URL to creator mapping, and then publishing the user's post with a creator element 606. After publishing the post, the flow 600 is complete 638.

FIG. 7 illustrates a general flow 700 for automatic creator identification of content to be shared in a social networking system 130 according to an embodiment of the invention. The illustrated flow 700 begins with receiving 702, from a user device of a user of the social networking system 130, a sharing message comprising a resource identifier that identifies a resource including content that is to be shared with one or more other users of the social networking system. In an embodiment, the one or more other users are "friends" of the user within the social networking system 130. The flow 700 further includes retrieving the resource identified by the resource identifier by transmitting 704, from a network interface to a server end station, a request for the resource, and then receiving the resource at the network interface from the server end station.

The flow 700 continues with automatically identifying the creator of the content of the resource based upon the received resource 708. In some embodiments, the retrieved resource is a document (e.g., an HTML document) and the automatic identification comprises identifying 710 a meta tag within the document (e.g., based on the Open Graph Protocol provided by Facebook or another HTML meta tag) and then selecting, as the creator, a value of that meta tag.

In some embodiments, the automatic identification comprises identifying 712 a first set of one or more candidate creators from the document, identifying a second set of one or more candidate creators from text provided by other users of the social networking system describing or commenting upon the content, and identifying the creator based upon the first set of candidate creators and the second set of candidate creators. For example, the creator is identified by determining how often each candidate creator of the first set of candidate creators exists within the user-generated text (e.g., message text, comment text) provided by the other users of the social networking that is associated with posts including the URL.

After identifying a creator of the content, the flow 700 continues with causing a preview to be displayed to the one or more other users of the social networking system 130 on a set of one or more user devices of the one or more other users. The preview identifies the creator, and includes a user interface element allowing the respective other user to view additional content from the creator (e.g., visit a page of the entity in the social networking system) or become associated with the creator within the social networking system (e.g., "follow" the creator, create an edge between the user node of the user and the object node of the entity).

Data Processing System Components

Figure 8:
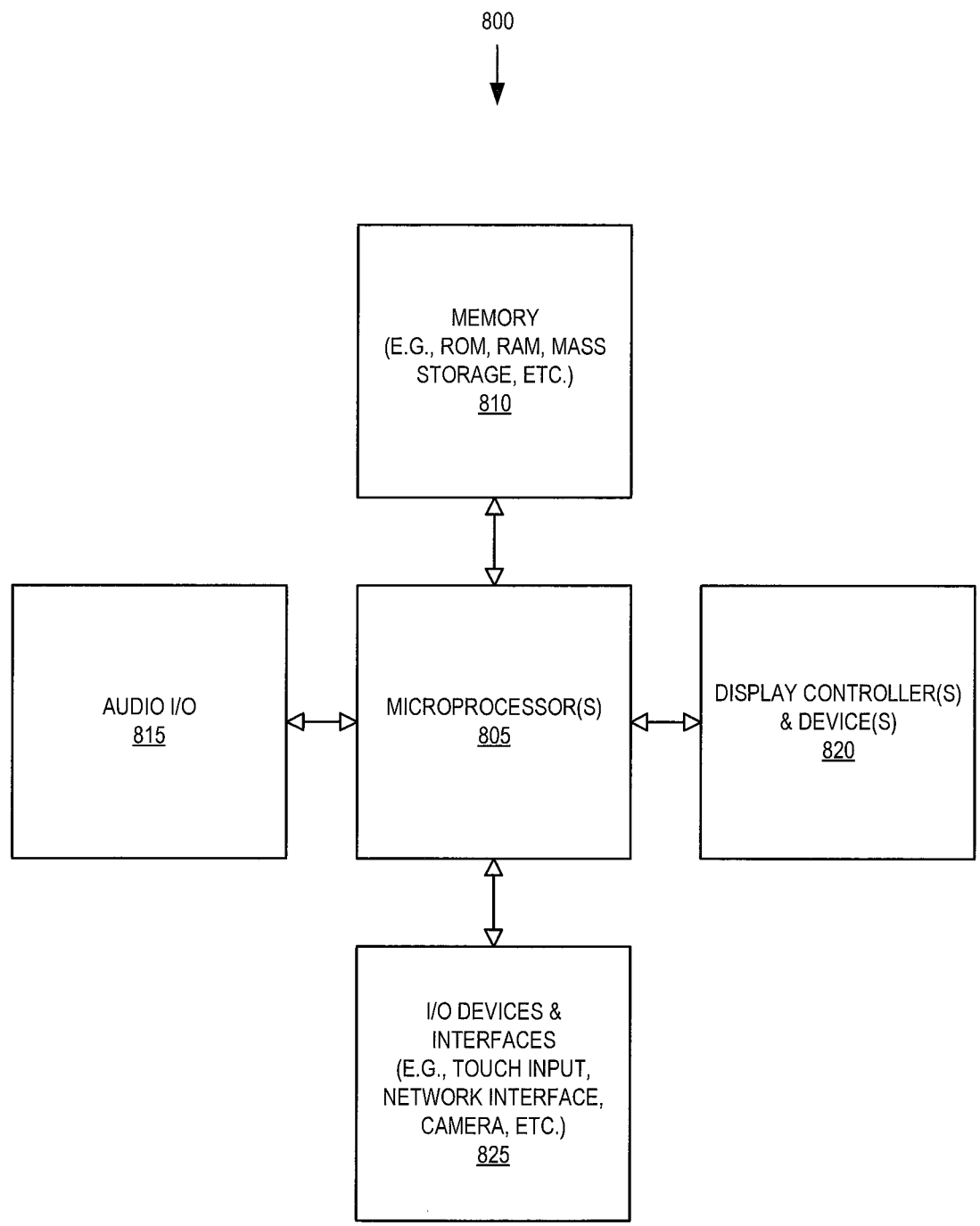
FIG. 8 illustrates a block diagram for an exemplary processing system to provide social network functionalities according to an embodiment of the invention.

FIG. 8 illustrates a block diagram for an exemplary data processing system 800 to provide social network functionalities according to an embodiment of the invention. Data processing system 800 includes one or more microprocessors 805 and connected system components (e.g., multiple connected chips). Alternatively, the data processing system 800 is a system on a chip. One or more such data processing systems 800 may be utilized to implement the functionality of the social networking system 130, user devices 104A-104N, and/or the external server 115, as illustrated in FIG. 1.

The data processing system 800 includes memory 810, which is coupled to the microprocessor(s) 805. The memory 810 may be used for storing data, metadata, and programs for execution by the microprocessor(s) 805. The memory 810 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 810 may be internal or distributed memory.

The data processing system 800 also includes an audio input/output subsystem 815 which may include a microphone and/or a speaker for, for example, playing back music or other audio, receiving voice instructions to be executed by the microprocessor(s) 805, playing audio notifications, etc. A display controller and display device 820 provides a visual user interface for the user, e.g., GUI windows.

The data processing system 800 also includes one or more input or output ("I/O") devices and interfaces 825, which are provided to allow a user to provide input to, receive output from, and otherwise transfer data to and from the system. These I/O devices 825 may include a mouse, keypad or a keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 800.

The I/O devices and interfaces 825 may also include a connector for a dock or a connector for a USB interface, FireWire, Thunderbolt, Ethernet, etc., to connect the system 800 with another device, external component, or a network. Exemplary I/O devices and interfaces 825 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 800 with another device, external component, or a network and receive stored instructions, data, tokens, etc. It will be appreciated that one or more buses may be used to interconnect the various components shown in FIG. 8.

The data processing system 800 is an exemplary representation of a user device (e.g., 104A), but any of these features may also be utilized by one or more devices implementing the social networking system 130. The data processing system 800 may be a personal computer (PC), tablet-style device, a personal digital assistant (PDA), a cellular telephone (e.g., smartphone), a Wi-Fi based telephone, a handheld computer which may optionally include a cellular telephone, a media player, an entertainment system, or devices which combine aspects or functions of these devices, such as a media player combined with a PDA and a cellular telephone in one device. In other embodiments, the data processing system 800 may be a network computer, server, or an embedded processing device within another device or consumer electronic product. As used herein, the terms computer, system, device, processing device, and "apparatus comprising a processing device" may be used interchangeably with the term data processing system 800 and include the above-listed exemplary embodiments.

It will be appreciated that additional components, not shown, may also be part of the system 800, and, in certain embodiments, fewer components than that shown in FIG. 8 may also be used in a data processing system 800. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 810 or other non-transitory machine-readable storage medium. The software may further be transmitted or received over a network (not shown) via a network interface device 825. In various embodiments, hardwired circuitry may be used in combination with the software instructions to implement the present embodiments. Thus, the techniques are not limited to any specific combination of hardware circuitry and software, or to any particular source for the instructions executed by the data processing system 800.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing a Field-Programmable Gate Array (FPGA), Application-Specific Integrated Circuit (ASIC), a processor, a computer, or a computer system including a network. Modules and components of hardware or software implementations can be divided or combined without significantly altering embodiments of the invention.

In the foregoing description, numerous specific details are set forth. However, it is understood that embodiments of the invention may be practiced without these specific details. References in this specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the foregoing description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the term "module" is used throughout the description and may refer to a hardware circuit and/or software stored in memory to be run on a processor. It should be noted that one or more modules may be combined or have their functionality further broken down.

Bracketed text and blocks with dashed borders (e.g., large dashes, small dashes, dot-dash, dots) are used herein to illustrate optional operations or components that add additional features to embodiments of the invention. However, such notation should not be taken to mean that these are the only options or optional operations, and/or that blocks with solid borders are not optional in certain embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method, comprising:
    accessing a received resource identifier that identifies a resource including content that is to be shared with a set of one or more users of a communication system;
    transmitting, from a network interface to a server end station, a request for the resource identified by the resource identifier;
    accessing, at the network interface, the resource from the server end station;
    automatically identifying a creator of the content based upon data within the received resource by:
        identifying an account of the creator of the content on the communication system, the account comprising information received from the creator of the content;
        accessing, from the information received from the creator of the content, an identifier;
        matching the identifier received from the creator of the content with an identifier from the received resource;
        identifying a first set of one or more candidate creators from the resource;
        identifying a second set of one or more candidate creators from user-submitted content provided by a set of one or more other users of the communication system describing or commenting upon the content; and
        identifying the creator of the content based upon a number of occurrences of each candidate creator in the first set of one or more candidate creators and a number of occurrences of each candidate creator in the second set of candidate creators; and
    transmitting a preview of the resource to be displayed to the set of one or more users on a set of one or more user devices, wherein the preview identifies the creator of the content and includes a selectable user interface element allowing the set of one or more users to interact with the account of the creator of the content within the communication system.

2. The computer-implemented method of claim 1, wherein the selectable user interface element allows a user to view additional content from the account of the creator of the content or become associated with the account of the creator of the content within the communication system.

3. The computer-implemented method of claim 2, further comprising identifying the account of the creator of the content within a social graph store of the communication system.

4. The computer-implemented method of claim 3, wherein the selectable user interface element is a link to a page for the account within the communication system.

5. The computer-implemented method of claim 3, further comprising:
    accessing a message received from one of the set of one or more user devices generated based upon one of the set of one or more users utilizing the selectable user interface element to become associated with the creator of the content within the communication system; and
    creating, in the social graph store, an edge between a user account of the one of the set of one or more users and the account of the creator of the content.

6. The computer-implemented method of claim 2, wherein the selectable user interface element is a link to a page within the communication system for the creator of the content.

7. The computer-implemented method of claim 1, wherein the creator of the content is an author or publisher of the content.

8. The computer-implemented method of claim 1, wherein the resource is a document, and wherein said automatically identifying further comprises:
    identifying a meta tag within the document; and
    selecting, as the creator of the content, a value of the meta tag.

9. The computer-implemented method of claim 1, wherein said automatically identifying further comprises:
    identifying, within the received resource, a link to another page associated with the creator of the content;
    transmitting a request for the other page;
    accessing the other page;
    identifying, within the other page, an identifier of the creator of the content; and
    determining the creator of the content of the received resource by matching the identifier of the creator with a value previously provided by the creator to the communication system.

10. A non-transitory computer-readable storage medium storing instructions which, when executed by one or more processors in set of one or more processing devices, cause the set of one or more processing devices to implement a communication system and perform operations comprising:
accessing a received resource identifier that identifies a resource including content that is to be shared with a set of one or more users of the communication system;
transmitting, to a server end station, a request for the resource identified by the resource identifier;
accessing, from the server end station, the resource identified by the resource identifier;
automatically identifying a creator of the content based upon data within the received resource by:
identifying an account of the creator of the content on the communication system, the account comprising information received from the creator of the content;
accessing, from the information received from the creator of the content, an identifier;
matching the identifier received from the creator of the content with an identifier from the received resource;
identifying a first set of one or more candidate creators from the resource;
identifying a second set of one or more candidate creators from user-submitted content provided by a set of one or more other users of the communication system describing or commenting upon the content; and
identifying the creator of the content based upon a number of occurrences of each candidate creator in the first set of one or more candidate creators and a number of occurrences of each candidate creator in the second set of candidate creators; and
transmitting a preview of the resource to be displayed to the set of one or more users on a set of one or more user devices, wherein the preview identifies the creator of the content and includes a selectable user interface element allowing the set of one or more users to interact with the account of the creator of the content within the communication system.

11. The non-transitory computer-readable storage medium of claim 10, wherein the selectable user interface element allows a user to view additional content from the account of the creator of the content or become associated with the account of the creator of the content within the communication system.

12. The non-transitory computer-readable storage medium of claim 11, wherein the operations further comprise:
identifying the account of the creator of the content within a social graph store of the communication system wherein the selectable user interface element is a link to a page for the account within the communication system.

13. The non-transitory computer-readable storage medium of claim 11, wherein the operations further comprise:
accessing a message received from one of the set of user devices generated based upon one of the set of one or more users utilizing the selectable user interface element to become associated with the creator of the content within the communication system; and
creating, in a social graph store, an edge between a user account of the one of the set of one or more users and the account of the creator of the content.

14. The non-transitory computer-readable storage medium of claim 10, wherein the resource is a document, and wherein said automatically identifying further comprises:
identifying a meta tag within the document; and
selecting, as the creator of the content, a value of the meta tag.

15. The non-transitory computer-readable storage medium of claim 10, wherein the resource is a document, and wherein said automatically identifying further comprises:
identifying a first set of accounts of one or more candidate creators from the document, each comprising one or more identifiers;
identifying a second set of accounts of one or more candidate creators, each comprising one or more identifiers, from user-submitted content provided by a set of one or more other users of the communication system describing or commenting upon the content; and
identifying the creator of the content based upon a number of occurrences of identifiers of each candidate creator in the first set of accounts of one or more candidate creators and a number of occurrences of identifiers of each candidate creator in the second set of accounts of one or more candidate creators.

16. A communication system, comprising:
a set of one or more network interfaces that,
communicatively couples the communication system to a network, and
receives a resource identifier that identifies a resource including content that is to be shared with a set of one or more users of the communication system;
a resource retrieval module coupled to the set of one or more network interfaces that,
transmits, to server end stations hosting the resources of the resource identified by the resource identifier, a request for the resource, and
receives, from the server end stations, the resource identified by the resource identifier; and
a content creator identification analysis module coupled to the resource retrieval module and the set of network interfaces that,
automatically identifies a creator of the content from the received resource based upon data within the received resource by:
identifying an account of the creator of the content on the communication system, the account comprising information received from the creator of the content;
accessing, from the information received from the creator of the content, an identifier;
matching the identifier received from the creator of the content with an identifier from the received resource;
identifying a first set of one or more candidate creators from the resource;
identifying a second set of one or more candidate creators from user-submitted content provided by a set of one or more other users of the communication system describing or commenting upon the content; and
identifying the creator of the content based upon a number of occurrences of each candidate creator in the first set of one or more candidate creators and a number of occurrences of each candidate creator in the second set of candidate creators; and
transmits a preview of the resource to be displayed to the set of one or more users via user devices of the set of one or more users, wherein each of the previews identifies the creator of the content and includes a selectable user interface element allowing the set of one or more users to interact with the account of the creator of the content within the communication system.

17. The communication system of claim 16, wherein the selectable user interface element allows a user to view additional content from the account of the creator of the content or become associated with the account of the creator of the content within the communication system.

18. The communication system of claim 17, wherein the selectable user interface element is a link to a page within the communication system for the creator of the content.

19. The communication system of claim 16, wherein the resource is a document, and wherein the content creator identification analysis module automatically identifying the creator of the content from the received resource further comprises:
   identifying a meta tag within the document; and
   selecting, as the creators, a value of the meta tags.

20. The communication system of claim 16, wherein the resource is a document, and wherein the content creator identification analysis module automatically identifying the creator of the content from the received resource further comprises:
   identifying a first set of accounts of one or more candidate creators from the document, each comprising one or more identifiers;
   identifying a second set of accounts of one or more candidate creators, each comprising one or more identifiers, from user-submitted content provided by a set of one or more other users of the communication system describing or commenting upon the content; and
   identifying the creator of the content based upon a number of occurrences of identifiers of each candidate creator in the first set of accounts of candidate creators and a number of occurrences of identifiers of each candidate creator in the second set of accounts of candidate creators.

* * * * *